(12) United States Patent
Liu et al.

(10) Patent No.: US 11,575,592 B2
(45) Date of Patent: Feb. 7, 2023

(54) MESSAGE PROCESSING METHOD AND APPARATUS, CONTROL-PLANE DEVICE, AND COMPUTER STORAGE MEDIUM

(71) Applicant: ZTE CORPORATION, Shenzhen (CN)

(72) Inventors: Cangming Liu, Shenzhen (CN); Xianjin Hong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 93 days.

(21) Appl. No.: 17/271,901

(22) PCT Filed: Dec. 26, 2019

(86) PCT No.: PCT/CN2019/128654
§ 371 (c)(1),
(2) Date: Feb. 26, 2021

(87) PCT Pub. No.: WO2020/135574
PCT Pub. Date: Jul. 2, 2020

(65) Prior Publication Data
US 2021/0194788 A1   Jun. 24, 2021

(30) Foreign Application Priority Data
Dec. 28, 2018 (CN) .................. 201811619224.5

(51) Int. Cl.
*H04L 43/18* (2022.01)
*H04L 9/40* (2022.01)
*H04L 67/025* (2022.01)

(52) U.S. Cl.
CPC .......... *H04L 43/18* (2013.01); *H04L 63/0428* (2013.01); *H04L 63/08* (2013.01); *H04L 67/025* (2013.01)

(58) Field of Classification Search
CPC ..... H04L 43/18; H04L 63/0428; H04L 63/08; H04L 67/025
(Continued)

(56) References Cited

U.S. PATENT DOCUMENTS

| 7,665,094 B2 * | 2/2010 | Frender .................. G06F 9/465 |
| | | 719/310 |
| 2004/0168003 A1 * | 8/2004 | Howard ..................... G06F 8/60 |
| | | 710/62 |
| 2012/0033681 A1 | 2/2012 | Ridel et al. |
| 2017/0187577 A1 * | 6/2017 | Nevrekar ............ H04L 41/0226 |

FOREIGN PATENT DOCUMENTS

| CN | 102281189 A | 12/2011 |
| CN | 102868758 A | 1/2013 |

(Continued)

OTHER PUBLICATIONS

International Search Report Form PCT/ISA/210, and Written Opinion Form PCT/ISA/237, International Application No. PCT/CN2019/128654, pp. 1-5 International Filing Date Dec. 26, 2019 dated Mar. 30, 2020.

(Continued)

*Primary Examiner* — James E Springer
(74) *Attorney, Agent, or Firm* — George McGuire

(57) ABSTRACT

Provided are a message processing method and apparatus, a control-plane device and a computer storage medium. The method includes receiving a first message containing at least one type of private-format data; determining identification information of a target device according to the first message and selecting a message parsing plug-in that matches the determined identification information of the target device; and sending the first message to the selected message parsing plug-in and receiving parsed data from the selected message parsing plug-in, where the parsed data is data obtained after the selected message parsing plug-in parses (Continued)

the at least one type of private-format data in the first message; and determining, according to the parsed data, a manner in which the target device processes a second message used for accessing a website.

17 Claims, 8 Drawing Sheets

(58) Field of Classification Search
USPC .......................................................... 709/206
See application file for complete search history.

(56) References Cited

FOREIGN PATENT DOCUMENTS

| | | | |
|---|---|---|---|
| CN | 103093342 A | * | 5/2013 |
| CN | 103093342 A | | 5/2013 |
| CN | 103905382 A | | 7/2014 |
| CN | 107770012 A | * | 3/2018 |
| CN | 107770012 A | | 3/2018 |
| EP | 2472911 A1 | | 7/2012 |
| EP | 2894833 A1 | | 7/2015 |
| WO | 2004055659 A1 | | 7/2004 |
| WO | WO-2011029238 A1 | * | 3/2011 ............. H04L 67/20 |
| WO | 2014071605 A1 | | 5/2014 |
| WO | WO-2015139397 A1 | * | 9/2015 ......... H04L 12/6418 |
| WO | 2017203327 A1 | | 11/2017 |
| WO | 2018001089 A1 | | 1/2018 |
| WO | 2018041152 A1 | | 3/2018 |

OTHER PUBLICATIONS

Translated Chinese First Search Report, dated Aug. 16, 2022. pp. 1-3.
Translated Chinese First Office Action, dated Aug. 23, 2022. pp. 1-5.
European Search Report, dated Aug. 4, 2022. pp. 1-8.

* cited by examiner

MESSAGE PROCESSING METHOD AND APPARATUS, CONTROL-PLANE DEVICE, AND COMPUTER STORAGE MEDIUM

CROSS-REFERENCES TO RELATED APPLICATIONS

This application is a national stage application filed under 35 U.S.C. 371 based on International Patent Application No. PCT/CN2019/128654, filed on Dec. 26, 2019, which claims priority to Chinese Patent Application No. 201811619224.5 filed with the CNIPA on Dec. 28, 2018, the disclosures of which are incorporated herein by reference in their entireties.

TECHNICAL FIELD

Embodiments of the present application relate to, but are not limited to, the field of message processing of a virtual Broadband Remote Access Server (vBRAS), and for example, to a message processing method and apparatus, a control-plane device and a computer storage medium.

BACKGROUND

By using advanced software-defined network (SDN) and network function virtualization (NFV) technologies, a virtual Broadband Remote Access Server (vBRAS) enables separation between the forwarding plane and the control plane of a conventional Broadband Remote Access Server (BRAS) product. A vBRAS can be divided into a vBRAS control plane and a vBRAS forwarding plane. The vBRAS forwarding plane has distributed deployment and diversified forms. The vBRAS forwarding plane includes a hard forwarding plane implemented based on a conventional network processor (NP) and a virtual forwarding plane implemented based on an x86 server. The vBRAS control plane centrally controls and manages the vBRAS forwarding plane and centrally controls and manages vBRAS forwarding-plane devices produced by different vendors, making up for the shortcomings of a conventional physical BRAS product.

It is urgent to solve the problem as to how to parse private-format data defined by different vendors in the scenario where the vBRAS control plane and the vBRAS forwarding plane are separated and the vBRAS control plane centrally controls and manages vBRAS forwarding-plane devices produced by different vendors.

SUMMARY

Embodiments of the present application provide a message processing method and apparatus, a control-plane device and a computer storage medium which are capable of parsing private-format data of different vendors compatibly.

Embodiments of the present application provide a message processing method. The method includes receiving a first message containing at least one type of private-format data; determining identification information of a target device according to the first message and selecting a message parsing plug-in that matches the determined identification information of the target device; and sending the first message to the selected message parsing plug-in and receiving parsed data from the selected message parsing plug-in, where the parsed data is data obtained after the selected message parsing plug-in parses the at least one type of private-format data in the first message; and determining, according to the parsed data, the manner in which the target device processes a second message used for accessing a website.

Embodiments of the present application further provide a message processing apparatus. The apparatus includes a processor and a memory configured to store a computer program capable of running on the processor. The processor is configured to perform the message processing method of any one of embodiments of the present application when executing the computer program.

Embodiments of the present application further provide a message processing apparatus. The apparatus includes a receiving module configured to receive a first message containing at least one type of private-format data; a first processing module configured to determine identification information of a target device according to the first message and select a message parsing plug-in that matches the determined identification information of the target device; and send the first message to the selected message parsing plug-in and receive parsed data from the selected message parsing plug-in, where the parsed data is data obtained after the selected message parsing plug-in parses the at least one type of private-format data in the first message; and a second processing module configured to determine, according to the parsed data, the manner in which the target device processes a second message used for accessing a website.

Embodiments of the present application further provide a control-plane device. The device includes the message processing apparatus of any one of embodiments of the present application.

Embodiments of the present application further provide a computer storage medium storing a computer program therein. The computer program, when executed by a processor, performs the message processing method of any one of embodiments of the present application.

DETAILED DESCRIPTION

The present application is described below in conjunction with drawings and embodiments. The embodiments described herein are intended to explain the present application and not to limit the present application.

Figure 1:
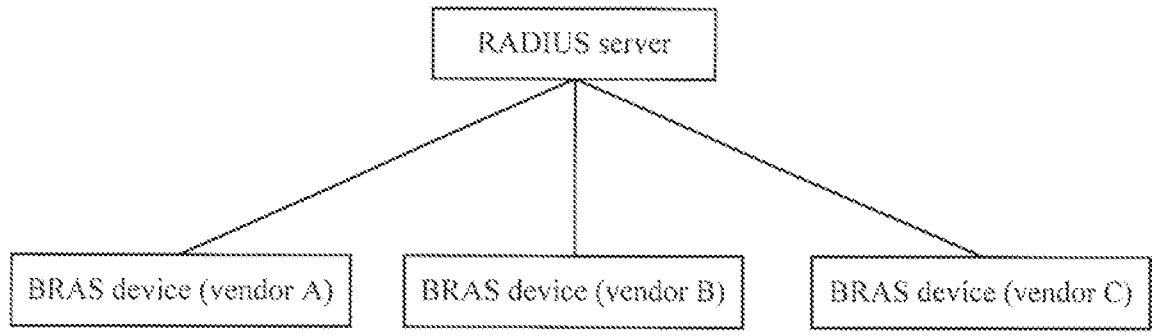
FIG. 1 is a networking diagram of a physical BRAS and a Remote Authentication Dial-In User Service (RADIUS) server according to embodiments of the present application.

In the related art, a physical BRAS includes a control plane and a forwarding plane; a physical BRAS provided by each vendor may serve as a RADIUS client that communicates with a RADIUS server according to the RADIUS protocol defined in a Request for Comments (RFC) and performs authentication, authorization and charging of broadband user access through the RADIUS server. FIG. 1 is a networking diagram of a physical BRAS and a RADIUS server according to embodiments of the present application. As shown in FIG. 1, BRAS device (vendor A), BRAS device (vendor B) and BRAS device (vendor C) are physical BRASs of three different vendors. BRAS device (vendor A), BRAS device (vendor B) and BRAS device (vendor C) can communicate with a RADIUS server separately.

The RADIUS protocol is extensible. Attribute 26 (vendor-specific attributes) is defined in the RADIUS protocol to support the extension of private attributes of different vendors. The vendor-specific attributes contain vendor-identifier (vendor-ID) attributes and vendor-defined private sub-attributes. A vendor-ID indicates the identifier of a vendor. A physical BRAS parses only a private attribute for which the vendor-ID matches the identifier of the device vendor in the vendor-specific attributes. If the vendor-ID does not match the identifier of the device vendor, an unrecognizable type of attribute is ignored.

The control plane and the forwarding plane of a vBRAS can be separated from each other. In the scenario where a vBRAS control plane centrally controls and manages vBRAS forwarding-plane devices produced by different vendors, when a vBRAS control plane provided by a single vendor communicates with a RADIUS server, the problem arises as to how to parse private attributes defined by different vendors and returned by the RADIUS server.

A vBRAS is already the future development direction of a physical BRAS. The reason why a vBRAS control plane has not achieved the central control and management of vBRAS forwarding-plane devices produced by different vendors is that no interface standard is defined between a vBRAS control plane and a vBRAS forwarding plane.

Additionally, in a vBRAS architecture, the vBRAS control plane has been virtualized. It is also a development trend to solve problems of a vBRAS by using the virtualization technology. This trend includes the adoption of a microservices architecture. In the microservices architecture, an application is split into fine-grained services, that is, miniaturized services. Each service is so miniaturized that the service only needs to focus on doing one thing well. Each service runs in a separate process. The boundary between the services is clear. In the microservices architecture, mutual communication is performed using lightweight communication mechanisms (such as HyperText Transfer Protocol (HTTP) and Representational State Transfer (RESTFUL)) and a complete application is implemented through cooperation between multiple services. Thus, the microservices architecture can satisfy the requirements of traffic and users.

Based on the preceding content, the embodiments below are provided.

Embodiment One

Embodiment one of the present application provides a message processing method. The method is applicable to a control-plane device. Exemplarily, the control-plane device may be a vBRAS control-plane device.

Figure 2:
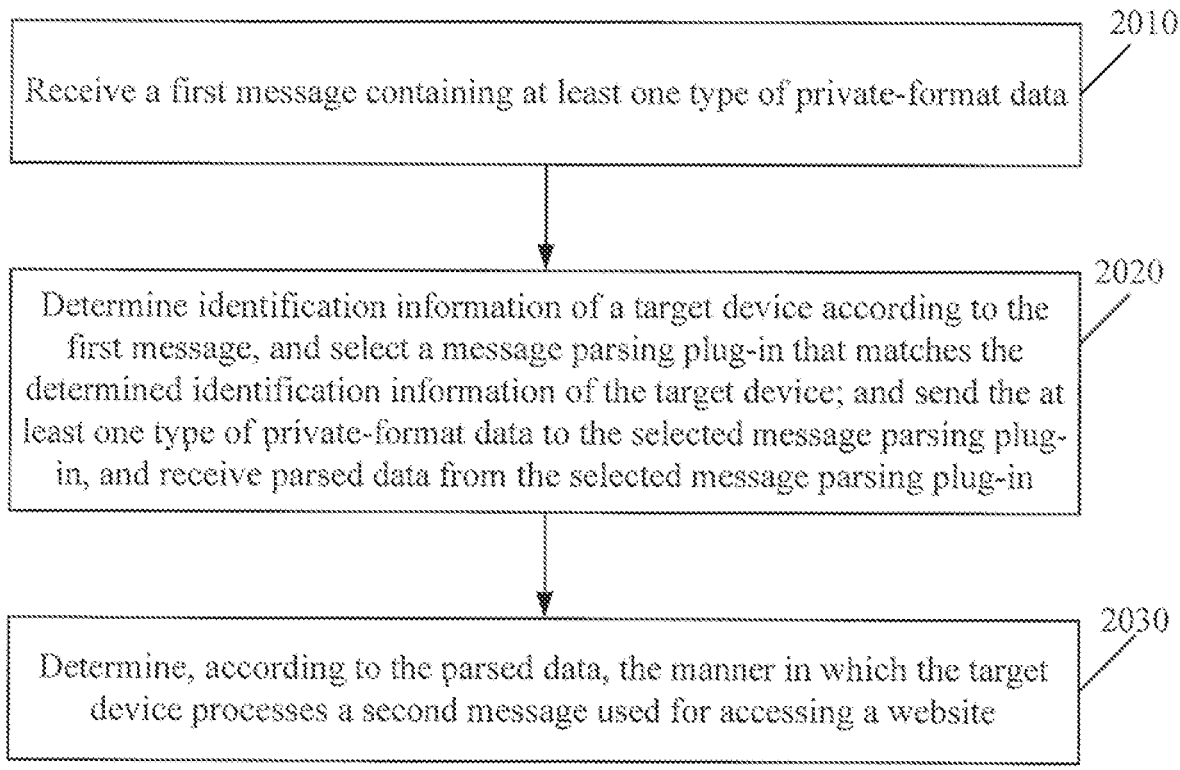
FIG. 2 is a flowchart of a message processing method according to embodiments of the present application.

FIG. 2 is a flowchart of a message processing method according to embodiments of the present application. As shown in FIG. 2, the method includes the steps below.

In step 2010, a first message containing at least one type of private-format data is received.

In this embodiment, the private-format data may be private-attribute data defined by a vendor. In practical application, a private-format data source may send a message containing private-format data to a control-plane device, and the control-plane device may receive the message from the private-format data source. The private-format data source is a device that sends a message containing private-format data defined by at least one vendor.

Optionally, the preceding private-format data source may be an authentication and authorization server such as a RADIUS server or another type of authentication and authorization server.

In practical application, the control-plane device is configured to centrally control and manage multiple controlled devices and communicate with the private-format data source uniformly. The controlled devices do not communicate with the private-format data source. In this embodiment, a controlled device may be a forwarding-plane device. Exemplarily, the vBRAS control-plane device may communicate with a RADIUS server through the RADIUS protocol defined by an RFC to complete authentication, authorization and charging of broadband user access and may centrally control and manage vBRAS forwarding-plane devices according to the communication protocol between the vBRAS control plane and the vBRAS forwarding plane.

In step 2020, identification information of a target device is determined according to the first message, and a message parsing plug-in that matches the determined identification information of the target device is selected; and the at least one type of private-format data is sent to the selected message parsing plug-in, and parsed data is received from the selected message parsing plug-in, where the parsed data is obtained after the selected message parsing plug-in parses the at least one type of private-format data.

In this embodiment, target devices may be service processing devices provided by different vendors. Exemplarily, each target device is a controlled device under the control of the vBRAS control-plane device and can be connected to the vBRAS control-plane device. In this embodiment of the present application, one or more target devices are connected to the vBRAS control-plane device. Each target device may report identification information to the vBRAS control-plane device through a communication protocol followed by multiple vendors and receive a control attribute sent by the vBRAS control-plane device.

Optionally, the target device is a forwarding-plane device. For example, the target device is a vBRAS forwarding-plane device. In an implementation, the target device may include at least one of a BRAS, a Broadband Network Gateway (BNG), a Broadband Service Gateway (BSG), a service router (SR), a Broadband Access Server (BAS), an Openflow Logical Switch (OFLS), an Openflow Switch (OFS), an access controller (AC), an optical line terminal (OLT), an aggregation switch, or software capable of running on a server providing a computing service and capable of simulating the functions of a physical broadband access server.

The identification information of the target device is used for identifying the target device. The identification information of the target device may include category identification information and unique identification information. The category identification information is used for identifying the category of the target device. The unique identification information is used for uniquely identifying the target device. Different target devices of the same category may have the same category identification information. In this manner, category identification information can be used for identifying target devices in the same category. Category identification information facilitates mass deployment of target devices. Unique identification information and target devices are in one-to-one correspondence. Unique identification information facilitates separate upgrade of a target device without affecting the normal operation of other devices. That is, when a target device is upgraded separately, only the unique identification information corresponding to this target device needs to be changed, and the identification information of other target devices does not need to be changed.

The preceding two types of identification information (category identification information and unique identification information) can be mixed in one system. That is, in a system composed of multiple target devices, a control-plane device, and a private-format data source, the identification information corresponding to each target device includes both category identification information and unique identification information.

In an implementation, the category identification information includes the identifier (ID) of the vendor to which the target device belongs.

In an implementation, the unique identification information may include the ID of the target device.

Exemplarily, the identification information of the target device is determined according to the first message in the following manner: when the first message is an authentication response message for a broadband access authentication request, the identification information of the target device is determined according to the value of the identifier field in the first message. Optionally, it is feasible to find access information of corresponding broadband user according to the value of the identifier field in the first message; and determine the identification information of the target device according to the broadband user access information. During implementation, it is feasible to find, according to the broadband user access information, the corresponding target device and the identification information reported by the found target device, thereby determining the identification information of the target device.

In this embodiment of the present application, when category identification information is used to identify a target device, for the target devices of the same category, one message parsing plug-in may be identified by category identification information, and in this case, the target devices of the same category may share the one message parsing plug-in; and when unique identification information is used to identify a target device, message parsing plug-ins are in one-to-one correspondence with target devices.

In this embodiment of the present application, the message parsing plug-in may be a service module provided by a vendor and capable of parsing private-format data. In actual application, the message parsing plug-in may receive vendor-defined private-format data sent by the control-plane device, may parse, according to the identification information of the vendor to which the message parsing plug-in belongs, private-format data recognizable by the message parsing plug-in, and may return the parsing result to the control-plane device.

The message sent by the control-plane device to the message parsing plug-in may contain private-format data of multiple vendors. Therefore, the message received by one message parsing plug-in may include private-format data of multiple different vendors. For example, during implementation, after the control-plane device sends the at least one type of private-format data to the selected message parsing plug-in, the message parsing plug-in receives the at least one type of private-format data and then parses parsable private-format data in the at least one type of private-format data to obtain parsed data. The message parsing plug-in may send the parsed data to the control-plane device.

In an embodiment, after receiving a message containing private-format data of multiple different vendors, the control-plane device may send the message containing private-format data of multiple different vendors to one message parsing plug-in; after receiving the message containing private-format data of multiple different vendors, the message parsing plug-in may filter the message containing private-format data of multiple different vendors according to the identification information of the message parsing plug-in and then parse private-format data parsable by the message parsing plug-in to obtain parsed data.

In practical application, in an example, the signal transmission channel between the message parsing plug-in and the control-plane device may be a separately set signal transmission channel. For example, when the message parsing plug-in is deployed independently of the forwarding-plane device, the signal transmission channel between the message parsing plug-in and the control-plane device may be a separately set signal transmission channel. In another example, the signal transmission channel between the control-plane device and the message parsing plug-in and the channel between the control-plane device and the forwarding-plane device are deployed as the same channel. That is, the signal transmission channel between the control-plane device and the message parsing plug-in may share the signal transmission channel between the control-plane device and the forwarding-plane device. For example, when the message parsing plug-in is deployed at the forwarding-plane device, the signal transmission channel between the control-plane device and the message parsing plug-in and the signal transmission channel between the control-plane device and the forwarding-plane device are deployed as the same channel.

In an embodiment, to select a message parsing plug-in that matches the determined identification information of the target device, it is needed to establish a correspondence between the identification information of target devices and the identification information of message parsing plug-ins in advance. In this manner, after receiving the message, the control-plane device may select, according to the correspondence, the message parsing plug-in that matches the determined identification information of the target device.

The correspondence may be established in the following manner: Exemplarily, identification information reported by a plurality of target devices and identification information reported by a plurality of message parsing plug-ins are received; and then a correspondence between the identification information of the target devices and the identification information of the message parsing plug-ins is established according to the identification information reported by the target devices and the identification information reported by the message parsing plug-ins.

In practical application, the message parsing plug-in may report identification information to the control-plane device through a communication protocol followed by multiple vendors.

In this embodiment, when the identification information reported by a target device is the same as or matches the identification information reported by a message parsing plug-in, a correspondence can be established between the identification information of the target device and the identification information of the message parsing plug-in. For example, when the identification information reported by an ith target device is the same as or matches the identification information reported by a jth message parsing plug-in, the identification information of the ith target device is considered to correspond to the identification information of the jth message parsing plug-in.

In an implementation, identification information reported by each target device includes the ID of the vendor to which the target device belongs, or identification information reported by each target device includes the ID of the respective vendor to which the target device belongs and the ID of the target device.

In an implementation, identification information reported by each message parsing plug-in includes the ID of the vendor to which the message parsing plug-in belongs, or identification information reported by each message parsing plug-in includes the ID of the respective vendor to which the message parsing plug-in belongs and the ID of a corresponding target device.

In an embodiment, after the correspondence between the identification information of the target devices and the identification information of the plug-ins is established, when identification information reported by a newly deployed target device and identification information reported by a newly deployed message parsing plug-in are received, the correspondence is updated according to the identification information reported by the newly deployed target device and the identification information reported by the newly deployed message parsing plug-in.

During implementation, after the identification information of the target device is determined, it is feasible to determine whether a message parsing plug-in that matches both the category identification information and the unique identification information of the determined target device can be found according to the correspondence; if a message parsing plug-in that matches both the category identification information and the unique identification information of the determined target device can be found, the found message parsing plug-in is selected as a message parsing plug-in that matches the identification information of the determined target device; if no message parsing plug-in that matches both the category identification information and the unique identification information of the determined target device can be found, it is determined whether a message parsing plug-in that matches the category identification information of the determined target device can be found.

If a message parsing plug-in that matches the category identification information of the determined target device can be found, the found message parsing plug-in is selected as a message parsing plug-in that matches the identification information of the determined target device; if no message parsing plug-in that matches the category identification information of the determined target device can be found, the first message can be ignored.

The message parsing plug-in is deployed in the following manner: in an example, the message parsing plug-in is deployed independently of a forwarding-plane device, for example, deployed independently in the microservice form; in another example, the message parsing plug-in is deployed at the forwarding-plane device.

In step 2030, the manner in which the target device processes a second message used for accessing a website is determined according to the parsed data.

In practical application, when the first message is an authentication response message for a broadband access authentication request, the control-plane device may obtain broadband user authorization information (private data required by the target device) according to the parsed data and the result obtained from parsing the first message by the control-plane device and then send the broadband user authorization information to the target device. The target device can determine, according to the broadband user authorization information, the manner of processing the second message. In an embodiment, the target device may write the broadband user authorization information into a user forwarding table and then process, according to the user forwarding table, the message used for accessing the website.

Exemplarily, the manner in which the second message used for accessing the website is processed may be forwarding or another processing manner.

In practical application, the control-plane device may send the broadband user authorization information to the corresponding target device through a communication protocol followed by multiple vendors.

In practical application, steps 2010 to 2030 may be performed by a processor in the preceding control-plane device. The processor may be at least one of an application-specific integrated circuit (ASIC), a digital signal processor (DSP), a digital signal processing device (DSPD), a programmable logic device (PLD), a field-programmable gate array (FPGA), a central processing unit (CPU), a controller, a microcontroller or a microprocessor.

The message processing method provided in embodiments of the present application includes receiving a first message containing at least one type of private-format data; determining identification information of a target device according to the first message and selecting a message parsing plug-in that matches the determined identification information of the target device; and sending the first message to the selected message parsing plug-in and receiving parsed data from the selected message parsing plug-in, where the parsed data is data obtained after the selected message parsing plug-in parses the at least one type of private-format data in the first message; and determining, according to the parsed data, the manner in which the target device processes a second message used for accessing a website. In this manner, private-format data of different vendors can be parsed compatibly by using the message plug-in and the solution of embodiments of the present application.

Figure 3:
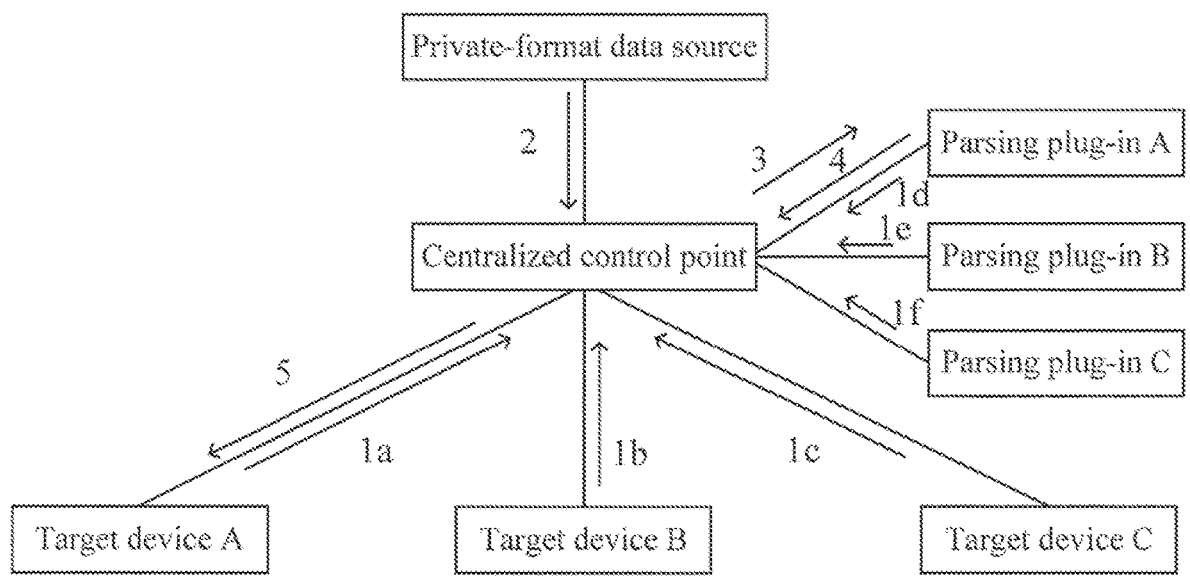
FIG. 3 is a networking diagram of a system capable of parsing private-format data of different vendors compatibly according to embodiments of the present application.

The message processing method provided in embodiments of the present application may also be illustrated with reference to FIGS. 3 and 4. FIG. 3 is a networking diagram of a system capable of parsing private-format data of different vendors compatibly according to embodiments of the present application. The system may include a centralized control point, target device A, target device B, target device C, parsing plug-in A, parsing plug-in B, parsing plug-in C and private-format data source. The centralized control point is the preceding vBRAS control-plane device. Target device A, target device B, and target device C are three target devices. Parsing plug-in A, parsing plug-in B and parsing plug-in C are three different message parsing plug-ins. Exemplarily, target device A corresponds to parsing plug-in A, that is, the identification information of target device A matches parsing plug-in A; target device B corresponds to parsing plug-in B, that is, the identification information of target device B matches parsing plug-in B; target device C corresponds to parsing plug-in C, that is, the identification information of target device C matches parsing plug-in C. The centralized control point of FIG. 3 may communicate with the private-format data source, target device A, target device B, target device C, parsing plug-in A, parsing plug-in B and parsing plug-in C separately.

Figure 4:
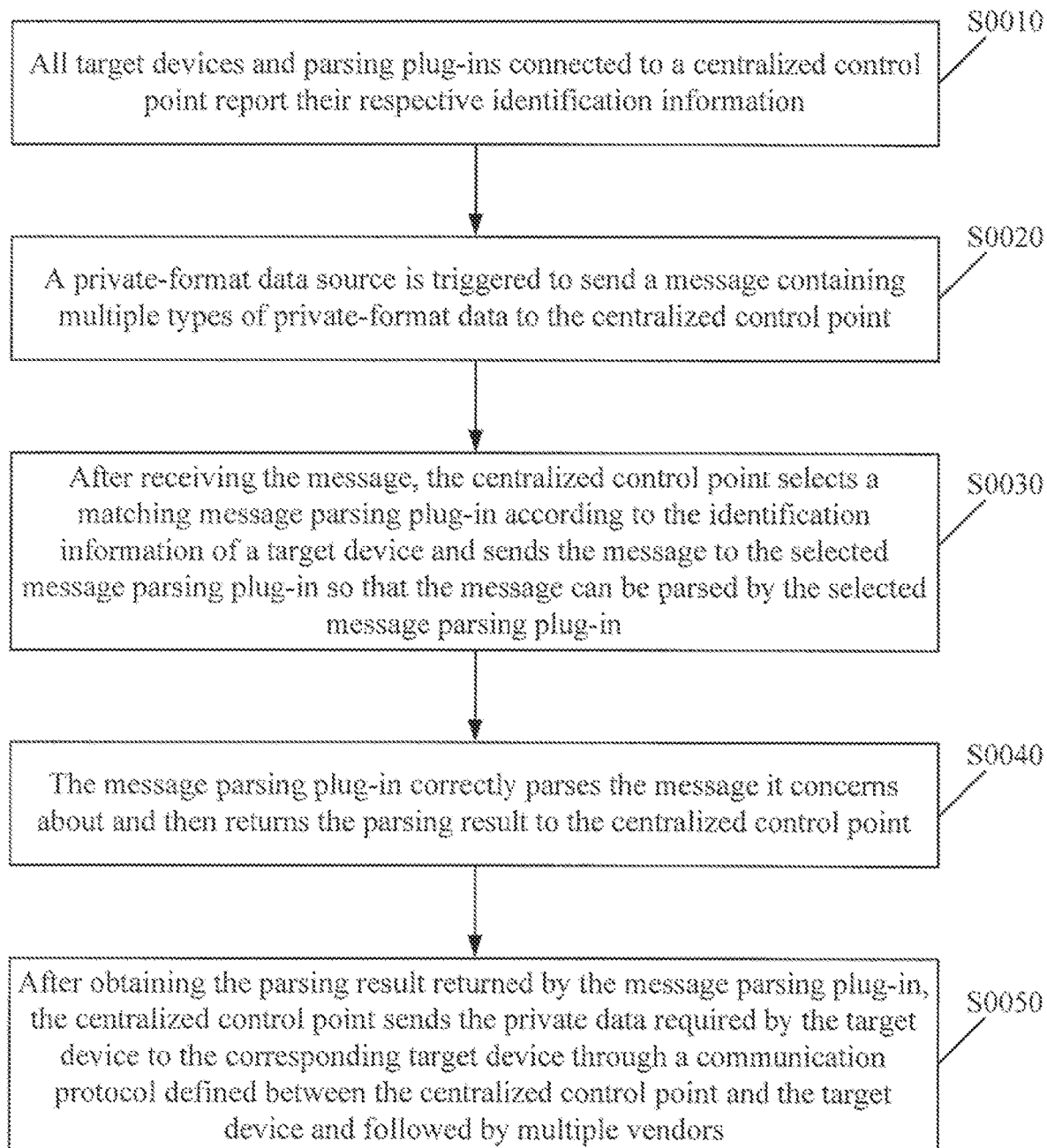
FIG. 4 is a flowchart of another message processing method according to embodiments of the present application.

FIG. 4 is a flowchart of another message processing method according to embodiments of the present application. As shown in FIGS. 3 and 4, the method includes the steps below.

In step S0010, all target devices and parsing plug-ins connected to the centralized control point report their respective identification information. For this step, reference may be made to arrow lines marked with characters 1a, 1b, 1c, 1d, 1e and 1f in FIG. 3.

In step S0020, the private-format data source is triggered to send a message containing multiple types of private-format data to the centralized control point. For this step, reference may be made to the arrow line marked with the number 2 in FIG. 3.

In step S0030, after receiving the message, the centralized control point selects a matching message parsing plug-in according to the identification information of a target device and sends the message to the selected message parsing plug-in so that the message can be parsed by the selected message parsing plug-in. For this step, reference may be made to the arrow line marked with the number 3 in FIG. 3.

In step S0040, the message parsing plug-in correctly parses the message it concerns about and then returns the parsing result (parsed data) to the centralized control point. For this step, reference may be made to the arrow line marked with the number 4 in FIG. 3.

In step S0050, after obtaining the parsing result returned by the message parsing plug-in, the centralized control point sends the private data required by the target device to the corresponding target device through a communication protocol defined between the centralized control point and the target device and followed by multiple vendors.

In this embodiment, the parsing result is the private data required by the target device. For this step, reference may be made to the arrow line marked with the number 5 in FIG. 3.

Based on the process shown in FIG. 4, when receiving private-format data defined by different vendors, the centralized control point can parse the private-format data therein correctly without knowing a private format definition (that is, a vendor-defined private protocol). That is, the private-format data of different vendors can be parsed compatibly by adopting the technical solution of embodiments of the present application.

It can be seen from the preceding description that by adopting the message processing method of embodiments of the present application, the private-format data defined by different vendors can be parsed correctly in the scenario where the vBRAS control plane is separated from the vBRAS forwarding plane and is used to centrally control and manage vBRAS forwarding-plane devices produced by different vendors. In this manner, vBRAS equipment can be compatible with existing private authorization attributes provided by different vendors. For example, when the vBRAS control plane communicates with the RADIUS server, the vBRAS control plane can correctly parse private-format data defined by different vendors and returned by the RADIUS server.

In an embodiment, when a vBRAS forwarding-plane device vendor needs to extend a private attribute (private protocol) for the purpose of providing a special function and special performance, it is only required that the vBRAS forwarding plane related to the vendor and the corresponding message parsing plug-in be upgraded independently and the private authorization attribute (private protocol) defined by the vendor be added into the RADIUS server. The vBRAS control plane is not required to be upgraded. In this manner, the stable operation of the vBRAS control plane and the stable operation of the vBRAS forwarding planes of other vendors are ensured.

Embodiment Two

To embody the object of the present application, this embodiment is illustrated based on embodiment one of the present application.

The networking system of embodiment two of the present application is described below.

A centralized control point is a vBRAS control plane. Through the OpenFlow protocol defined by the Open Networking Foundation (ONF), the vBRAS control plane centrally controls and manages vBRAS forwarding planes, supports a microservices architecture and allows multiple vendors to provide private extension functions in the form of microservices. Through the RESTFUL interface, the vBRAS control plane is connected to the message parsing plug-in microservices provided by these vendors. The vBRAS control plane and the message parsing plug-in microservices provided by multiple vendors are deployed on a data center virtualization platform constructed of x86 servers and switches.

A private-format data source is a RADIUS server. According to the RADIUS protocol defined by the Internet Engineering Task Force (IETF), the RADIUS server sends private extended attributes defined by multiple vendors to the vBRAS control plane. The private extended attributes belong to attribute 26 defined by the RADIUS protocol, that is, vendor-specific attributes. Each vendor-specific attribute in a RADIUS protocol message contains a vendor identifier (vendor-ID) and a private sub-attribute extended by a vendor.

A message parsing plug-in is a microservice provided by a vendor and can identify and parse a vendor-specific attribute related to the vendor. The message parsing plug-in receives, through the RESTFUL interface, vendor-specific attribute information sent by the vBRAS control plane, parses the vendor-specific attribute defined by the vendor and sends the parsing result as a response to the vBRAS control plane.

A target device is a vBRAS forwarding-plane device that is centrally controlled and managed by the vBRAS control plane. Through the Experimenter message defined by the OpenFlow protocol, the vBRAS forwarding plane can report its own identifier to the vBRAS control plane and receive authorization information sent by the vBRAS control plane.

The hardware modules include an x86 server and a BRAS device.

Figure 5:
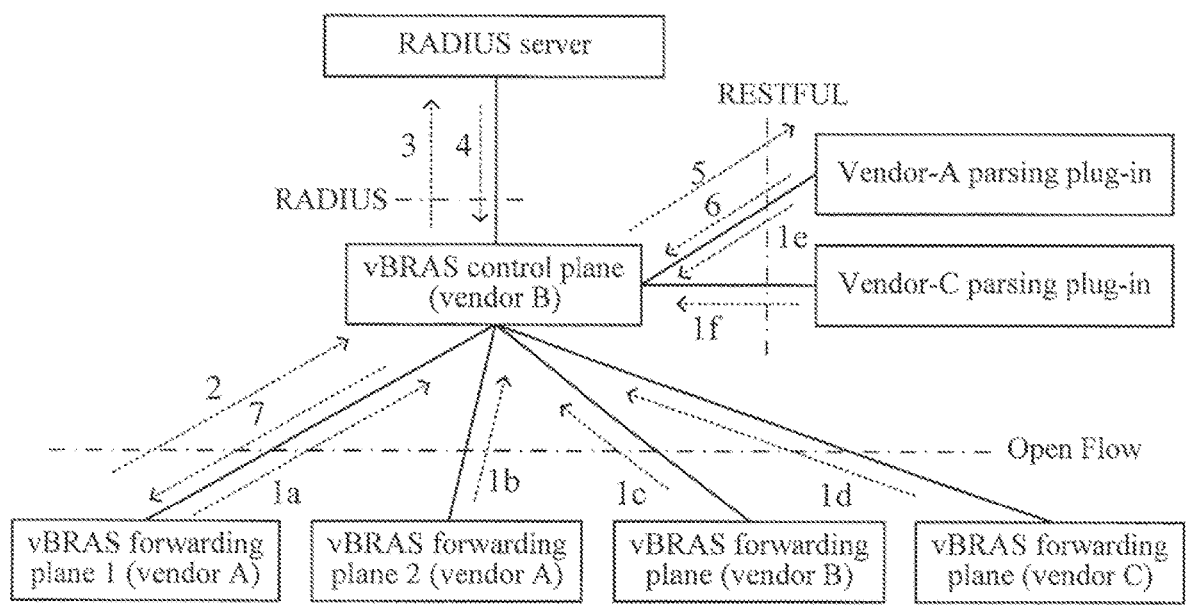
FIG. 5 is a networking diagram of another system capable of parsing private-format data of different vendors compatibly according to embodiments of the present application.

FIG. 5 is a networking diagram of another system capable of parsing private-format data of different vendors compatibly according to embodiments of the present application. As shown in FIG. 5, vBRAS control plane (vendor B) is a control-plane device provided by vendor B, the vendor-A parsing plug-in and the vendor-C parsing plug-in are a message parsing plug-in provided by vendor A and a message parsing plug-in provided by vendor C respectively, vBRAS forwarding plane 1 (vendor A) and vBRAS forwarding plane 2 (vendor A) are two vBRAS forwarding-plane devices provided by vendor A, and vBRAS forwarding plane (vendor B) and vBRAS forwarding plane (vendor C) are a vBRAS forwarding-plane device provided by vendor B and a vBRAS forwarding-plane device provided by vendor C respectively.

The vBRAS control plane (vendor B) can be connected to the message parsing plug-in microservices provided by other vendors through the RESTFUL interface. To be connected to the vBRAS control plane provided by vendor B, each of the vBRAS forwarding-plane devices of other vendors not only needs to follow the communication protocol between the vBRAS control plane and the vBRAS forwarding plane, but also needs to provide a message parsing plug-in connected to the vBRAS control plane. The provided message parsing plug-in can parse the vendor-defined private-format data sent by the RADIUS server to the vBRAS control plane. In the case where the functions of the vBRAS forwarding planes provided by the same vendor are the same, the functions of the corresponding message parsing plug-ins are also the same. Therefore, multiple vBRAS forwarding planes provided by the same vendor can share the same message parsing plug-in, that is, each vendor needs to deploy only one message parsing plug-in connected to the vBRAS control plane, simplifying the deployment operation of the message parsing plug-in and reducing occupation of data center resources (including CPU cores, memories, storages and networks) by the message parsing plug-in. For example, vBRAS forwarding plane 1 plane 1 (vendor A) and vBRAS forwarding plane 2 (vendor A) can share the vendor-A parsing plug-in.

Figure 6:
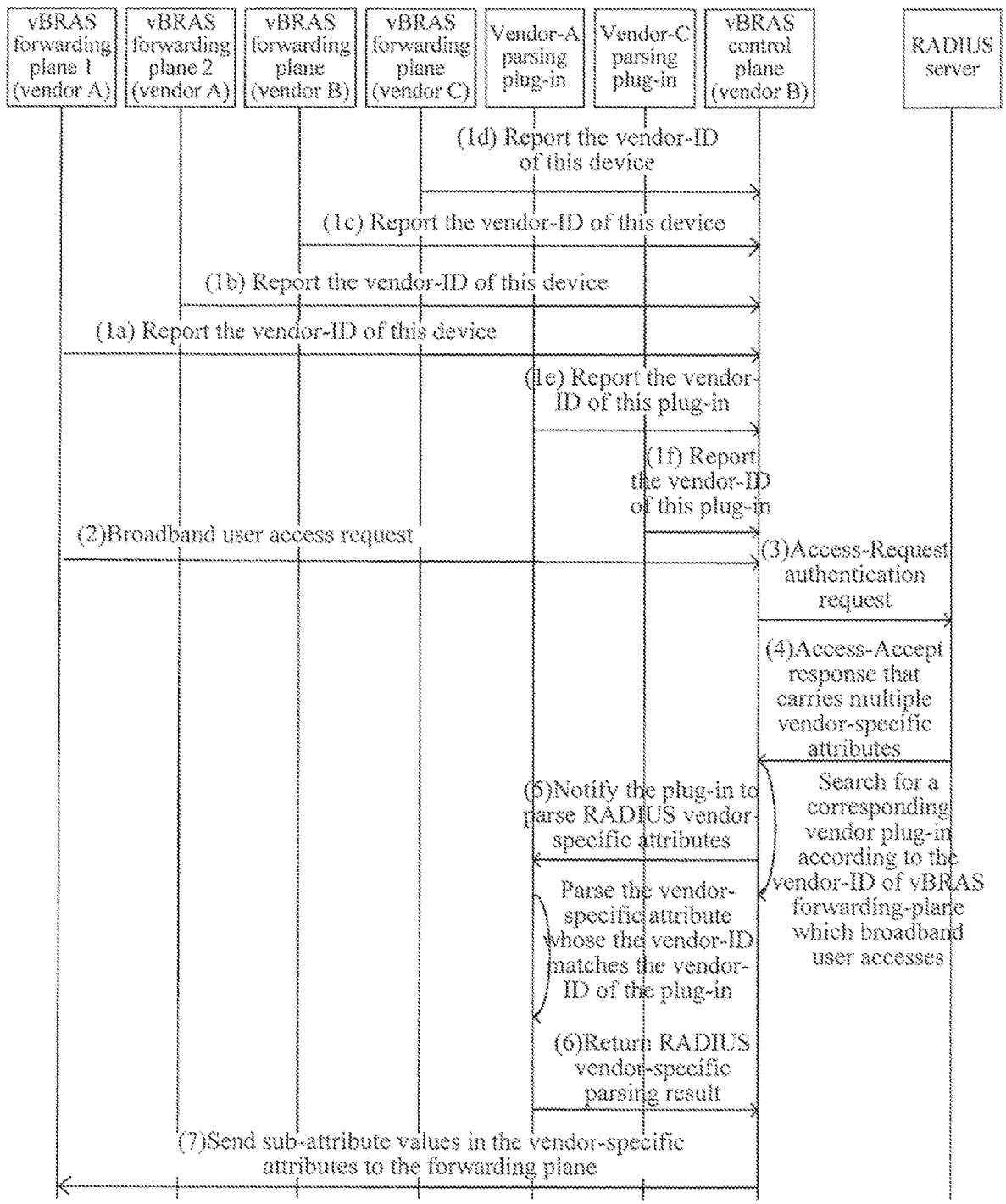
FIG. 6 is a flowchart of another message processing method according to embodiments of the present application.

In this embodiment, the vBRAS control plane uses a vendor-ID as the identification information of the corresponding target device and the corresponding message parsing plug-in. FIG. 6 is a flowchart of another message processing method according to embodiments of the present application. The workflow between the vBRAS control plane, the RADIUS server, the vBRAS forwarding planes and the parsing plug-ins is shown in FIG. 6.

In embodiment two of the present application, the process of the message processing method may include the steps below.

In step 5010, the vBRAS control-plane device is deployed. A new virtual machine or container is created on the cloud platform of the data center, and the vBRAS control-plane device provided by vendor B is started in the virtual machine or container.

In step 5020, the vendor-A parsing plug-in is deployed. A new virtual machine or container is created on the cloud platform of the data center, and the vendor-A parsing plug-in is started in the virtual machine or container.

In step 5030, the vendor-C parsing plug-in is deployed. A new virtual machine or container is created on the cloud platform of the data center, and the vendor-C parsing plug-in is started in the virtual machine or container.

In step 5040, the connection between the vBRAS control-plane device and the RADIUS server is configured. This step includes configuring the Internet Protocol (IP) address and the RADIUS protocol port number of the RADIUS server.

In step 5050, the connection from all vBRAS forwarding-plane devices of vendor A, vendor B and vendor C to the vBRAS control-plane device is configured. This step includes establishing a Virtual eXtensible Local Area Network (VXLAN) tunnel from a vBRAS forwarding plane to the vBRAS control plane and establishing OpenFlow connection from a vBRAS forwarding plane to the vBRAS control plane.

In step 5060, the vendor-A parsing plug-in is configured to register with the vBRAS control plane. Through the Uniform Resource Identifier (URI), the vendor-A parsing plug-in provides its own information to the vBRAS control plane, including the communication address and the vendor-ID. For this step, reference may be made to the arrow line marked with the character 1*e* in FIG. 5 and step (1*e*) in FIG. 6.

In step 5070, the vendor-C parsing plug-in is configured to register with the vBRAS control plane. Through the URI, the vendor-C parsing plug-in provides its own information to the vBRAS control plane, including the communication address and the vendor-ID. For this step, reference may be made to the arrow line marked with the character if in FIG. 5 and step (1*f*) in FIG. 6.

In step 5080, through the OpenFlow protocol, a vBRAS forwarding-plane device actively reports its own identification information, that is, the vendor-ID, to the vBRAS control plane. For this step, reference may be made to arrow lines marked with characters 1*a*, 1*b*, 1*c* and 1*d* in FIG. 5 and steps (1*a*), (1*b*), (1*c*) and (1*d*) in FIG. 6.

In step 5090, a broadband user starts to go online; vBRAS forwarding plane 1 plane 1 (vendor A) receives an Ethernet-based Point-to-Point Protocol over Ethernet (PPPoE) access request message sent by the broadband user and sends the received original PPPoE access request message and the corresponding receiving interface information (for example, interface Fei-2/1/0/2) to the vBRAS control plane through the VXLAN tunnel. For this step, reference may be made to the arrow line marked with the number 2 in FIG. 5 and step (2) in FIG. 6.

In step 5100, after receiving the PPPoE access request message, the vBRAS control-plane device performs processing of and response to the PPPoE access request message according to the PPPoE protocol. Through PPPoE access protocol message interaction, the vBRAS control-plane device obtains the user name information of the broadband user. The vBRAS control-plane device writes the user name information into the Access-Request authentication message defined by the RADIUS protocol and sends an Access-Request authentication request to the RADIUS server. For this step, reference may be made to the arrow line marked with the number 3 in FIG. 5 and step (3) in FIG. 6.

In step 5110, after receiving the Access-Request authentication request, the RADIUS server performs authentication according to the user name information carried in the authentication request; if the authentication succeeds, the RADIUS server sends an Access-Accept authentication response to the vBRAS control-plane device. Multiple vendor-specific attributes can be carried in the Access-Accept authentication response. For this step, reference may be made to the arrow line marked with the number 4 in FIG. 5 and step (4) in FIG. 6.

In step 5120, after receiving the Access-Accept authentication response message, the vBRAS control-plane device finds the access information of corresponding broadband user according to the value of the Identifier field in the message, including broadband access interface information, for example, interface Fei-2/1/0/2. Through the broadband access interface information, the vBRAS control-plane device obtains the corresponding vBRAS forwarding-plane device and the identifier, that is, the vendor-ID, reported by the vBRAS forwarding-plane device. The vBRAS control-plane device parses the attribute information carried in the Access-Accept authentication response message. If the Access-Accept authentication response message carries the vendor-specific attribute defined by the RADIUS protocol, the vBRAS control-plane device searches for a matching message parsing plug-in based on the corresponding vBRAS forwarding-plane identification information, that is, the vendor-ID. If the corresponding message parsing plug-in is found, the vBRAS control-plane device sends all vendor-specific attributes in the Access-Accept authentication response message to the corresponding message parsing plug-in through the RESTFUL interface according to the communication address registered by the message parsing plug-in so that the corresponding message parsing plug-in can process the attributes. For this step, reference may be made to the arrow line marked with the number 5 in FIG. 5 and step (5) in FIG. 6.

In step 5130, the vendor-A parsing plug-in receives vendor-specific attributes from the vBRAS control-plane device through the RESTFUL interface and determines whether the values of the vendor-IDs in the vendor-specific attributes are consistent with the vendor-ID of the vendor-A parsing plug-in; if the values of the vendor-IDs are inconsistent, parsing is forgone; if the values of the vendor-IDs are consistent, the vendor-ID of vendor-specific A is denoted by 4097 as defined by vendor A. When the vendor-A parsing plug-in receives 3 vendor-specific attributes sent by the vBRAS control-plane device and the values of the vendor-IDs carried by the 3 vendor-specific attributes are 4096, 4097 and 4098 respectively, the vendor-A parsing plug-in parses only the vendor-specific attribute with a vendor-ID value of 4097. According to the private data format defined by vendor A, the vendor-A parsing plug-in parses out all the sub-attributes contained in the vendor-specific attribute with a vendor-ID value of 4097. After completing the parsing of all the vendor-specific attributes and the sub-attributes contained in the vendor-specific attributes, the vendor-A parsing plug-in sends the sub-attributes required by the vBRAS control plane to the vBRAS control-plane device by responding to a post request. For this step, reference may be made to the arrow line marked with the number 6 in FIG. 5 and step (6) in FIG. 6.

In step 5140, the vBRAS control-plane device receives, from the RESTFUL interface, the parsing result of the vendor-specific attribute sent by the message parsing plug-in. Through the parsing result returned by the message parsing plug-in and the parsing of other attributes carried in the Access-Accept authentication response message, the vBRAS control-plane device obtains the broadband user authorization information.

In step 5150, after converting the authorization information that needs to be sent to a vBRAS forwarding plane into attributes defined by the communication protocol between the vBRAS control plane and the forwarding plane, the vBRAS control-plane device sends the broadband user authorization information to vBRAS forwarding plane 1 plane 1 (vendor A) through the OpenFlow channel between vBRAS control plane (vendor B) and vBRAS forwarding plane 1 (vendor A) and in the type-length-value (TLV) manner. In the TLV manner, each attribute value in the authorization information is transmitted according to the attribute type, attribute length and attribute value. For this step, reference may be made to the arrow line marked with the number 7 in FIG. 5 and step (7) in FIG. 6.

In step 5160, according to the definition of the communication protocol between the vBRAS control plane and a forwarding plane, the vBRAS forwarding-plane device receives the broadband user authorization information and writes the authorization information into the user forwarding table. The vBRAS forwarding-plane device subsequently processes and forwards, according to the user forwarding table, a message used by the broadband user to access a website.

Embodiment Three

To embody the object of the present application, this embodiment is illustrated based on embodiment one of the present application.

The networking system of embodiment three of the present application is described below.

A centralized control point is a vBRAS control plane. The vBRAS control plane centrally controls and manages physical and virtual vBRAS forwarding planes. A key component contained in a physical vBRAS forwarding-plane device is a dedicated processor (for example, NP, FPGA or ASIC) configured to process and forward high-traffic broadband access user service messages. A key component contained in a virtual vBRAS forwarding-plane device is a general-purpose x86 processor configured to process and forward low-traffic broadband access user service messages. In this embodiment, the Control-plane and User-plane Separation Protocol (CUSP) is used between the vBRAS control plane and a vBRAS forwarding plane. The CUSP is a communication protocol defined between the vBRAS control plane and the vBRAS forwarding plane based on the Transmission Control Protocol (TCP) and followed by multiple vendors. The vBRAS control plane is provided by a third party (not a vBRAS forwarding-plane device vendor), deployed on a data center virtualization platform constructed of x86 servers and switches, and runs on a virtual computer.

A private-format data source is a RADIUS server. According to the RADIUS protocol defined by the IETF, the RADIUS server sends private extended attributes defined by multiple vendors to the vBRAS control plane. The private extended attributes belong to attribute 26 defined by the RADIUS protocol, that is, vendor-specific attributes. Each vendor-specific attribute in a RADIUS protocol message contains a vendor-ID and a private sub-attribute extended by a vendor.

A message parsing plug-in is a software module provided by a vBRAS forwarding-plane device vendor and capable of identifying and parsing a vendor-specific attribute related to the vendor. The message parsing plug-in and a virtual vBRAS forwarding plane are deployed at the same position. Through the CUSP, the message parsing plug-in registers with the vBRAS control plane and sends its own identification information to the vBRAS control plane, receives the vendor-specific attribute information sent by the vBRAS control plane, parses the vendor-specific attribute information defined by the vendor and sends the parsing result as a response to the vBRAS control plane.

A target device is a vBRAS forwarding-plane device that is centrally controlled and managed by the vBRAS control plane. vBRAS forwarding-plane devices centrally controlled and managed by the vBRAS control plane include physical and virtual vBRAS forwarding-plane devices. Through the CUSP, a vBRAS forwarding plane reports its own identification information to the vBRAS control plane and receives authorization information sent by the vBRAS control plane.

The hardware modules include an x86 server and a BRAS device.

Figure 7:
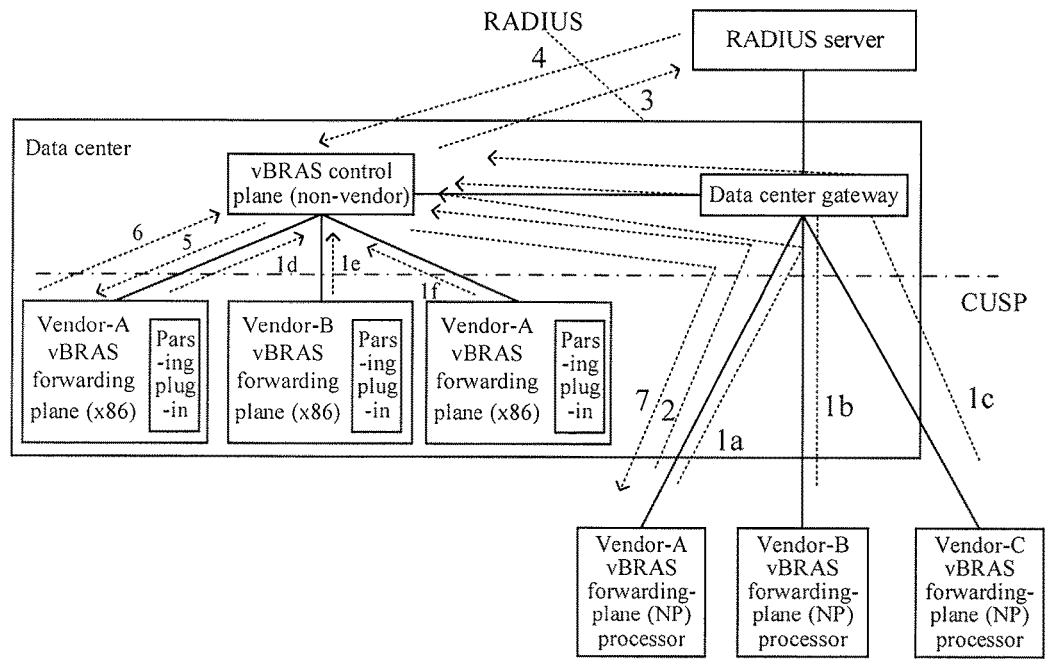
FIG. 7 is a networking diagram of another system capable of parsing private-format data of different vendors compatibly according to embodiments of the present application.

FIG. 7 is a networking diagram of another system capable of parsing private-format data of different vendors compatibly according to embodiments of the present application. As shown in FIG. 7, the vBRAS control plane (non-vendor) is provided by a third party (not a vBRAS forwarding-plane device vendor), the vendor-A forwarding plane (x86), the vendor-B forwarding plane (x86) and the vendor-C forwarding plane (x86) are a virtual vBRAS forwarding-plane device provided by vendor A, a virtual vBRAS forwarding-plane device provided by vendor B and a virtual vBRAS forwarding-plane device provided by vendor C respectively, and each of the vendor-A forwarding plane (x86), the vendor-B forwarding plane (x86) and the vendor-C forwarding plane (x86) provides a corresponding message parsing plug-in (see parsing plug-ins in FIG. 7); the vendor-A forwarding plane (NP), the vendor-B forwarding plane (NP) and the vendor-C forwarding plane (NP) are a physical vBRAS forwarding-plane device provided by vendor A, a physical vBRAS forwarding-plane device provided by vendor B and a physical vBRAS forwarding-plane device provided by vendor C respectively; the vendor-A forwarding plane (x86), the vendor-B forwarding plane (x86) and the vendor-C forwarding plane (x86) all can communicate with the vBRAS control plane (non-vendor); the vendor-A forwarding plane (NP), the vendor-B forwarding plane (NP) and the vendor-C forwarding plane (NP) all can communicate with the vBRAS control plane (non-vendor) through a data center gateway; the RADIUS server can communicate with the vBRAS control plane (non-vendor) and the data center gateway.

The vBRAS control plane (non-vendor) can control and manage vBRAS forwarding-plane devices through the CUSP. The vBRAS forwarding-plane devices include physical and virtual vBRAS forwarding-plane devices. A physical vBRAS forwarding-plane device is deployed at the edge of a metropolitan area network and used for high-traffic user access services such as high-speed Internet (HSI), Internet Protocol television (IPTV), video chat, and real-time game. A virtual vBRAS forwarding-plane device is deployed in a data center and used for low-traffic user access services such as Voice over Internet Protocol (VoIP), and the network management protocol Technical Report 069 (TR-069) defined in the Broadband Forum Technical Report 069. A message parsing plug-in as a software module and a virtual vBRAS forwarding plane provided by the vendor of the message parsing plug-in are deployed at the same position without the need to independently allocate additional resources (including CPU cores, memories, storages and networks). Moreover, the message parsing plug-in also reports its own identification information to the vBRAS control plane through the CUSP. In this manner, the protocol processing is unified, and thus the workload of developing vBRAS control-plane protocols is reduced.

In this embodiment, the vBRAS control plane uses a vendor-ID as the identification information of the corresponding target device and the corresponding message parsing plug-in. The workflow between the vBRAS control plane, the RADIUS server, the vBRAS forwarding planes and the parsing plug-ins is shown in FIG. 7.

In embodiment three of the present application, the process of the message processing method may include the steps below.

In step 7010, the vBRAS control-plane device is deployed. A new virtual machine or container is created on the cloud platform of the data center, and the vBRAS control-plane device provided by a third party (not a vBRAS forwarding-plane device vendor) is started in the virtual machine or container.

In step 7020, the virtual vBRAS forwarding planes provided by multiple vendors are deployed. A new virtual machine or container is created on the cloud platform of the data center, and the virtual vBRAS forwarding-plane software and message parsing plug-ins provided by multiple vendors are started in the virtual machine or container.

In step 7030, the connection between the vBRAS control-plane device and the RADIUS server is configured. This step includes configuring the IP address and the RADIUS protocol port number of the RADIUS server.

In step 7040, the connection from all vBRAS forwarding-plane devices of vendor A, vendor B and vendor C to the vBRAS control-plane device is configured. The vBRAS forwarding-plane devices include physical and virtual vBRAS forwarding-plane devices. The configuration includes establishing a VXLAN tunnel from a vBRAS forwarding plane to the vBRAS control plane and establishing CUSP connection from a vBRAS forwarding plane to the vBRAS control plane.

In step 7050, the vendor-A parsing plug-in is configured to register with the vBRAS control plane through the CUSP. The vendor-A parsing plug-in provides its own information to the vBRAS control plane, including the communication address and the vendor-ID. For this step, reference may be made to the arrow line marked with the character 1d in FIG. 7.

In step 7060, the vendor-B parsing plug-in is configured to register with the vBRAS control plane through the CUSP. The vendor-B parsing plug-in provides its own information to the vBRAS control plane, including the communication address and the vendor-ID. For this step, reference may be made to the arrow line marked with the character 1e in FIG. 7.

In step 7070, the vendor-C parsing plug-in is configured to register with the vBRAS control plane through the CUSP. The vendor-C parsing plug-in provides its own information to the vBRAS control plane, including the communication address and the vendor-ID. For this step, reference may be made to the arrow line marked with the character 1f in FIG. 7.

In step 7080, through the CUSP, all vBRAS forwarding-plane devices of vendor A, vendor B and vendor C report their respective identification information, that is, their respective vendor-IDs, to the vBRAS control plane. The vBRAS forwarding-plane devices include physical and virtual vBRAS forwarding-plane devices. For this step, reference may be made to arrow lines marked with characters 1a, 1b, 1c, 1d, 1e and 1f in FIG. 7.

In step 7090, a broadband user starts to go online; a vBRAS forwarding plane (for example, the vendor-A physical vBRAS forwarding-plane device) receives a PPPoE access request message sent by the broadband user and sends the received original PPPoE access request message and the corresponding receiving interface information (for example, interface Fei-2/1/0/2) to the vBRAS control plane through the VXLAN tunnel. For this step, reference may be made to the arrow line marked with the number 2 in FIG. 7.

In step 7100, after receiving the PPPoE access request message, the vBRAS control-plane device performs processing of and response to the PPPoE access request message according to the PPPoE protocol. Through PPPoE access protocol message interaction, the vBRAS control-plane device obtains the user name information of the broadband user. The vBRAS control-plane device writes the user name information into the Access-Request authentication message defined by the RADIUS protocol and sends an Access-Request authentication request to the RADIUS server. For this step, reference may be made to the arrow line marked with the number 3 in FIG. 7.

In step 7110, after receiving the Access-Request authentication request, the RADIUS server performs authentication according to the user name information carried in the authentication request; if the authentication succeeds, the RADIUS server sends an Access-Accept authentication response to the vBRAS control plane. For this step, reference may be made to the arrow line marked with the number 4 in FIG. 7.

In step 7120, after receiving the Access-Accept authentication response message, the vBRAS control-plane device finds the access information of corresponding broadband user according to the value of the Identifier field in the message, including broadband access interface information, for example, interface Fei-2/1/0/2. Through the broadband access interface information, the vBRAS control-plane device obtains the corresponding vBRAS forwarding-plane device and the identifier, that is, the vendor-ID, reported by the vBRAS forwarding-plane device. The vBRAS control-plane device parses the attribute information carried in the Access-Accept authentication response message. If the Access-Accept authentication response message carries the vendor-specific attribute defined by the RADIUS protocol, the vBRAS control-plane device searches for a matching message parsing plug-in based on the corresponding vBRAS forwarding-plane identification information, that is, the vendor-ID. If the corresponding message parsing plug-in is found, the vBRAS control plane sends all vendor-specific attributes in the Access-Accept authentication response message to the corresponding message parsing plug-in through the CUSP according to the communication address registered by the message parsing plug-in so that the corresponding message parsing plug-in can process the attributes. For this step, reference may be made to the arrow line marked with the number 5 in FIG. 7.

In step 7130, the vendor-A message parsing plug-in receives vendor-specific attributes from the vBRAS control plane and determines whether the values of the vendor-IDs in the vendor-specific attributes are consistent with the vendor-ID of the vendor-A message parsing plug-in; if the values of the vendor-IDs are inconsistent, parsing is forgone; if the values of the vendor-IDs are consistent, the vendor-specific attributes are parsed according to the definition of vendor A. For example, the vendor-ID of vendor A is 4097. When the vendor-A message parsing plug-in receives 3 vendor-specific attributes sent by the vBRAS control-plane device and the values of the vendor-IDs carried by the 3 vendor-specific attributes are 4096, 4097 and 4098 respectively, the vendor-A message parsing plug-in parses only the vendor-specific attribute with a vendor-ID value of 4097. According to the private data format defined by vendor A, the vendor-A message parsing plug-in parses out all the sub-attributes contained in the vendor-specific attribute with a vendor-ID value of 4097. After completing the parsing of all the vendor-specific attributes and the sub-attributes contained therein, the vendor-A message parsing plug-in sends the sub-attributes required by the vBRAS control plane to the vBRAS control plane through the CUSP connection from the vBRAS forwarding plane to the vBRAS control plane. For this step, reference may be made to the arrow line marked with the number 6 in FIG. 7.

In step 7140, the vBRAS control-plane device receives the parsing result of the vendor-specific attribute sent by the message parsing plug-in. Through the parsing result returned by the message parsing plug-in and the parsing of other attributes carried in the Access-Accept authentication response message, the vBRAS control-plane device obtains the broadband user authorization information.

In step 7150, after converting the authorization information that needs to be sent to a vBRAS forwarding plane into attributes defined by the communication protocol between the vBRAS control plane and the forwarding plane, the vBRAS control-plane device sends the broadband user authorization information to the corresponding vBRAS forwarding plane through the CUSP connection between the vBRAS control plane and the vBRAS forwarding plane (vendor-A physical vBRAS forwarding-plane device) and in the TLV manner. In the TLV manner, each attribute value in the authorization information is transmitted according to the attribute type, attribute length and attribute value. For this step, reference may be made to the arrow line marked with the number 7 in FIG. 7.

In step 7160, according to the definition of the communication protocol between the vBRAS control plane and a forwarding plane, the vBRAS forwarding-plane device (vendor-A physical vBRAS forwarding-plane device) receives the broadband user authorization information and writes the authorization information into the user forwarding table. The vBRAS forwarding-plane device subsequently processes and forwards, according to the user forwarding table, a message used by the broadband user to access a website.

Embodiment Four

To embody the object of the present application, this embodiment is illustrated based on embodiment one of the present application.

The networking system of embodiment four of the present application is described below.

A centralized control point is a vBRAS control plane. Through the CUSP, the vBRAS control plane centrally controls and manages vBRAS forwarding planes and communication between the vBRAS control plane and message parsing plug-ins is implemented. The vBRAS control plane is deployed on a data center virtualization platform constructed of x86 servers and switches.

A private-format data source is a RADIUS server. According to the RADIUS protocol defined by the IETF, the RADIUS server sends private extended attributes defined by multiple vendors to the vBRAS control plane. The private extended attributes belong to attribute 26 defined by the RADIUS protocol, that is, vendor-specific attributes. Each vendor-specific attribute in a RADIUS protocol message contains a vendor-ID and a private sub-attribute extended by a vendor.

A message parsing plug-in is a software module provided by a vBRAS forwarding-plane device vendor and capable of identifying and parsing a vendor-specific attribute related to the vendor. The message parsing plug-in and a vBRAS forwarding plane device are deployed at the same position. Through the CUSP, the parsing plug-in registers with the vBRAS control plane and sends its own identification information to the vBRAS control plane, receives the vendor-specific attribute information sent by the vBRAS control plane, parses the vendor-specific attribute information defined by the vendor and sends the parsing result as a response to the vBRAS control plane.

A target device is a vBRAS forwarding-plane device that is centrally controlled and managed by the vBRAS control plane. Through the CUSP, the vBRAS forwarding plane reports its own identifier to the vBRAS control plane and receives authorization information sent by the vBRAS control plane.

The hardware modules include an x86 server and a BRAS device.

Figure 8:
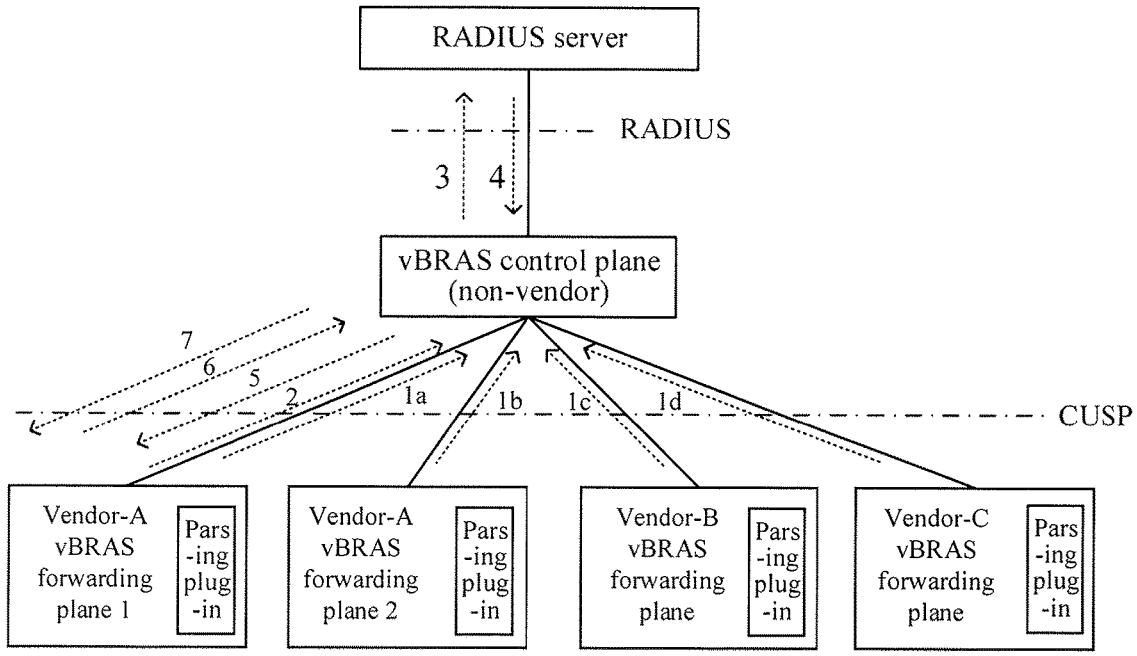
FIG. 8 is a networking diagram of another system capable of parsing private-format data of different vendors compatibly according to embodiments of the present application.

FIG. 8 is a networking diagram of another system capable of parsing private-format data of different vendors compatibly according to embodiments of the present application. As shown in FIG. 8, the vBRAS control plane (non-vendor) is provided by a third party (not a vBRAS forwarding-plane device vendor), vendor-A vBRAS forwarding plane 1 and vendor-A vBRAS forwarding plane 2 are two vBRAS forwarding-plane devices provided by vendor A, and the vendor-B vBRAS forwarding plane and the vendor-C vBRAS forwarding plane are a forwarding-plane device provided by vendor B and a forwarding-plane device provided by vendor C respectively; vendor-A vBRAS forwarding plane 1, the vendor-A vBRAS forwarding plane 2, the vendor-B vBRAS forwarding plane and the vendor-C vBRAS forwarding plane provide their respective message parsing plug-ins (see parsing plug-ins in FIG. 8); vendor-A vBRAS forwarding plane 1, the vendor-A vBRAS forwarding plane 2, the vendor-B vBRAS forwarding plane, the vendor-C vBRAS forwarding plane and their respective message parsing plug-ins all can communicate with the vBRAS control plane (non-vendor), and the vBRAS control plane (non-vendor) also can communicate with the RADIUS server.

The vBRAS control plane (non-vendor) controls and manages vBRAS forwarding-plane devices through the CUSP. A message parsing plug-in as a software module and a vBRAS forwarding-plane device provided by the vendor of the message parsing plug-in are deployed at the same position. The message parsing plug-ins are in one-to-one correspondence with the vBRAS forwarding-plane devices. When a vBRAS forwarding-plane device is turned off, the parsing of private attributes directed at other vBRAS forwarding-plane devices is not affected. Thus, the maintenance is convenient and flexible. Moreover, the message parsing plug-in also reports its own identification information to the vBRAS control plane through the CUSP. In this manner, the protocol processing is unified, and thus the workload of developing vBRAS control-plane protocols is reduced.

The vBRAS control plane uses a vendor-ID and the identification information of the corresponding forwarding-plane device as the identification information for identifying the corresponding forwarding-plane device and the corresponding message parsing plug-in. The workflow between the vBRAS control plane, the RADIUS server, the vBRAS forwarding planes and the parsing plug-ins is shown in FIG. 8.

In embodiment four of the present application, the process of the message processing method may include the steps below.

In step 8010, the vBRAS control-plane device is deployed. A new virtual machine or container is created on the cloud platform of the data center, and the vBRAS control plane provided by a third party (not a vBRAS forwarding-plane device vendor) is started in the virtual machine or container.

In step 8020, the connection between the vBRAS control-plane device and the RADIUS server is configured. This step includes configuring the IP address and the RADIUS protocol port number of the RADIUS server.

In step 8030, the connection from all vBRAS forwarding-plane devices of vendor A, vendor B and vendor C to the vBRAS control-plane device is configured. The configuration includes establishing a VXLAN tunnel from a vBRAS forwarding plane to the vBRAS control plane and establishing CUSP connection from a vBRAS forwarding plane to the vBRAS control plane.

In step 8040, the vendor-A message parsing plug-ins are configured to register with the vBRAS control plane through the CUSP. Each of the vendor-A message parsing plug-ins provides its own information to the vBRAS control plane, including the communication address, the vendor-ID and the identification information of the corresponding vBRAS forwarding-plane device. For this step, reference may be made to arrow lines marked with characters 1a and 1b in FIG. 8.

In step 8050, the vendor-B message parsing plug-in is configured to register with the vBRAS control plane through the CUSP. The vendor-B message parsing plug-in provides its own information to the vBRAS control plane, including the communication address, the vendor-ID and the identification information of the corresponding vBRAS forwarding-plane device. For this step, reference may be made to the arrow line marked with the character 1c in FIG. 8.

In step 8060, the vendor-C message parsing plug-in is configured to register with the vBRAS control plane through the CUSP. The vendor-C message parsing plug-in provides its own information to the vBRAS control plane, including the communication address, the vendor-ID and the identification information of the corresponding vBRAS forwarding-plane device. For this step, reference may be made to the arrow line marked with the character 1d in FIG. 8.

In step 8070, through the CUSP, all vBRAS forwarding-plane devices of vendor A, vendor B and vendor C report their respective identification information, that is, their respective device identification information and vendor-IDs, to the vBRAS control plane. For this step, reference may be made to arrow lines marked with characters 1a, 1b, 1c and 1d in FIG. 8.

In step 8080, a broadband user starts to go online; a vBRAS forwarding plane (for example, the vendor-A physical vBRAS forwarding-plane 1 device) receives a Dynamic Host Configuration Protocol (DHCP) access request message sent by the broadband user and sends the received original DHCP access request message and the corresponding receiving interface information (for example, interface Fei-2/1/0/2) to the vBRAS control plane through the VXLAN tunnel. For this step, reference may be made to the arrow line marked with the number 2 in FIG. 8.

In step 8090, after receiving the DHCP access request message, the vBRAS control-plane device performs processing of and response to the DHCP access request message according to the DHCP protocol. Through DHCP access protocol message interaction, the vBRAS control-plane device obtains the user name information of the broadband user through Option in the DHCP message. The vBRAS control-plane device writes the user name information into the Access-Request authentication message defined by the RADIUS protocol and sends an Access-Request authentication request to the RADIUS server. For this step, reference may be made to the arrow line marked with the number 3 in FIG. 8.

In step 8100, after receiving the Access-Request authentication request, the RADIUS server performs authentication according to the user name information carried in the authentication request; if the authentication succeeds, the RADIUS server sends an Access-Accept authentication response to the vBRAS control-plane device. For this step, reference may be made to the arrow line marked with the number 4 in FIG. 8.

In step 8110, after receiving the Access-Accept authentication response message, the vBRAS control-plane device finds the access information of corresponding broadband user according to the value of the Identifier field in the message, including broadband access interface information, for example, interface Fei-2/1/0/2. Through the broadband access interface information, the vBRAS control-plane device obtains the corresponding vBRAS forwarding-plane device and the identifier, that is, the vendor-ID and device identification information, reported by the vBRAS forwarding-plane device. The vBRAS control-plane device parses the attribute information carried in the Access-Accept authentication response message. If the Access-Accept authentication response message carries the vendor-specific attribute defined by the RADIUS protocol, the vBRAS control-plane device searches for a matching message parsing plug-in based on the corresponding vBRAS forwarding-plane identification information, that is, the vendor-ID and device identification information. If the corresponding message parsing plug-in is found, the vBRAS control-plane device sends all vendor-specific attributes in the Access-Accept authentication response message to the corresponding message parsing plug-in through the CUSP connection according to the communication address registered by the message parsing plug-in so that the corresponding message parsing plug-in can process the attributes. For this step, reference may be made to the arrow line marked with the number 5 in FIG. 8.

In step 8120, the vendor-A message parsing plug-in receives vendor-specific attributes from the vBRAS control-plane device and determines whether the values of the vendor-IDs in the vendor-specific attributes are consistent with the vendor-ID of the vendor-A message parsing plug-in; if the values of the vendor-IDs are inconsistent, parsing is forgone; if the values of the vendor-IDs are consistent, the vendor-specific attributes are parsed according to the definition of vendor A. For example, the vendor-ID of vendor A is 4097. When the vendor-A message parsing plug-in receives 3 vendor-specific attributes sent by the vBRAS control-plane device and the values of the vendor-IDs carried by the 3 vendor-specific attributes are 4096, 4097 and 4098 respectively, the vendor-A message parsing plug-in parses only the vendor-specific attribute with a vendor-ID value of 4097. According to the private data format defined by vendor A, the vendor-A message parsing plug-in parses out all the sub-attributes contained in the vendor-specific attribute with a vendor-ID value of 4097. After completing the parsing of all the vendor-specific attributes and the sub-attributes contained therein, the vendor-A message parsing plug-in sends the sub-attributes required by the vBRAS control plane to the vBRAS control-plane device through the CUSP connection from the vBRAS forwarding plane to the vBRAS control-plane device. For this step, reference may be made to the arrow line marked with the number 6 in FIG. 8.

In step 8130, the vBRAS control-plane device receives the parsing result of the vendor-specific attribute sent by the message parsing plug-in. Through the parsing result returned by the message parsing plug-in and the parsing of other attributes carried in the Access-Accept authentication response message, the vBRAS control-plane device obtains the broadband user authorization information.

In step 8140, after converting the authorization information that needs to be sent to a vBRAS forwarding plane into attributes defined by the communication protocol between the vBRAS control plane and the forwarding plane, the vBRAS control-plane device sends the broadband user authorization information to the corresponding vBRAS forwarding plane through the CUSP connection between the vBRAS control plane and the vBRAS forwarding plane (vendor-A vBRAS forwarding-plane 1 device) and in the TLV manner. In the TLV manner, each attribute value in the authorization information is transmitted according to the attribute type, attribute length and attribute value. For this step, reference may be made to the arrow line marked with the number 7 in FIG. 8.

In step 8150, according to the definition of the communication protocol between the vBRAS control plane and a forwarding plane, the vBRAS forwarding-plane device (vendor-A vBRAS forwarding-plane 1) receives the broadband user authorization information and writes the authorization information into the user forwarding table. The vBRAS forwarding-plane device subsequently processes and forwards, according to the user forwarding table, a message used by the broadband user to access a website.

Embodiment Five

To embody the object of the present application, this embodiment is illustrated based on embodiment one of the present application.

The networking system of embodiment five of the present application is described below.

A centralized control point is a vBRAS control plane. Through the CUSP, the vBRAS control plane centrally controls and manages vBRAS forwarding planes, supports a microservices architecture and allows multiple vendors to provide private extension functions in the form of microservices. Through the RESTFUL interface, the vBRAS control plane is connected to the message parsing plug-in microservices provided by these vendors. The vBRAS control plane and the message parsing plug-in microservices provided by multiple vendors are deployed on a data center virtualization platform constructed of x86 servers and switches.

A private-format data source is a RADIUS server. According to the RADIUS protocol defined by the IETF, the RADIUS server sends private extended attributes defined by multiple vendors to the vBRAS control plane. The private extended attributes belong to attribute 26 defined by the RADIUS protocol, that is, vendor-specific attributes. Each vendor-specific attribute in a RADIUS protocol message contains a vendor-ID and a private sub-attribute extended by a vendor.

A message parsing plug-in is a microservice provided by a vendor and can identify and parse a vendor-specific attribute related to the vendor. The message parsing plug-in receives, through the RESTFUL interface, vendor-specific attribute information sent by the vBRAS control-plane device, parses the vendor-specific attribute defined by the vendor and sends the parsing result as a response to the vBRAS control-plane device.

A target device is a vBRAS forwarding-plane device that is centrally controlled and managed by the vBRAS control plane. Through the CUSP, the vBRAS forwarding plane reports its own identifier to the vBRAS control plane and receives authorization information sent by the vBRAS control plane.

The hardware modules include an x86 server and a BRAS device.

Figure 9:
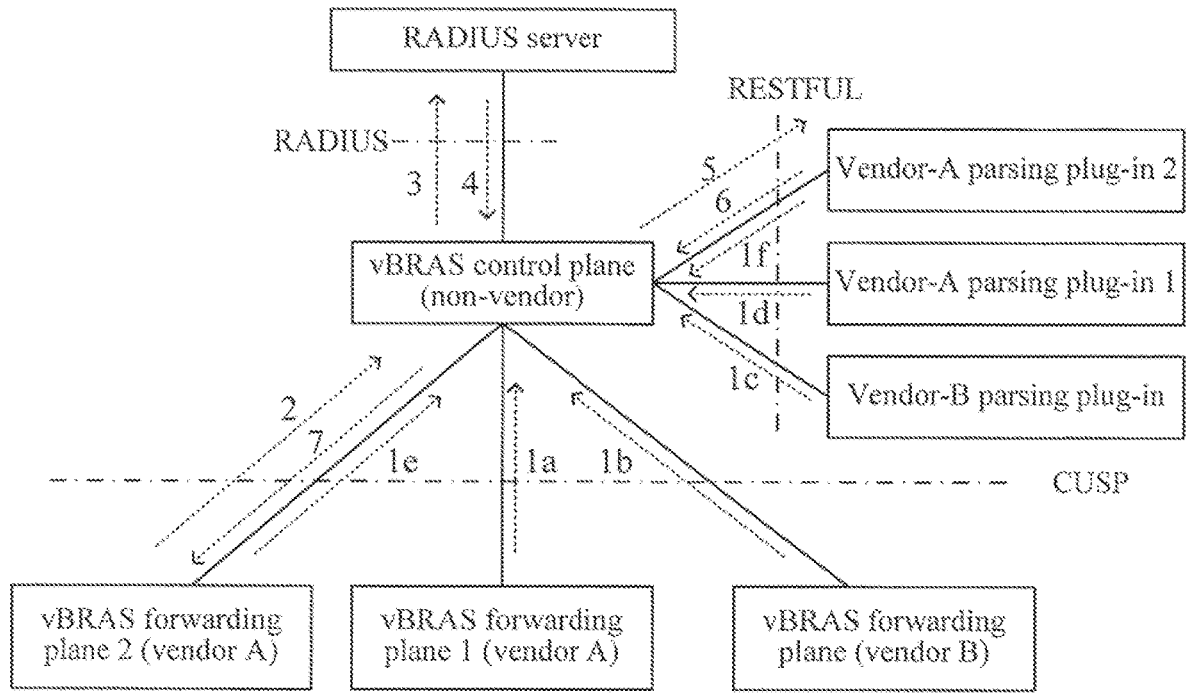
FIG. 9 is a networking diagram of another system capable of parsing private-format data of different vendors compatibly according to embodiments of the present application.

FIG. 9 is a networking diagram of another system capable of parsing private-format data of different vendors compatibly according to embodiments of the present application. As shown in FIG. 9, the vBRAS control plane (non-vendor) is provided by a third party (not a vBRAS forwarding-plane device vendor), vBRAS forwarding plane 1 (vendor A) and vBRAS forwarding plane 2 (vendor A) are two vBRAS forwarding-plane devices provided by vendor A, and vBRAS forwarding plane (vendor B) is a vBRAS forwarding-plane device provided by vendor B; vendor-A parsing plug-in 1 and vendor-A parsing plug-in 2 are two message parsing plug-ins provided by vendor A, where vendor-A parsing plug-in 1 matches the identification information of vBRAS forwarding plane 1 (vendor A), vendor-A parsing plug-in 2 matches the identification information of vBRAS forwarding plane 2 (vendor A), and the vendor-B parsing plug-in matches the identification information of the vBRAS forwarding plane (vendor B); and the vBRAS control plane (non-vendor) may communicate with vBRAS forwarding plane 1 (vendor A), vBRAS forwarding plane 2 (vendor A), vBRAS forwarding plane (vendor B), vendor-A parsing plug-in 1, vendor-A parsing plug-in 2, the vendor-B parsing plug-in and the RADIUS server separately.

The vBRAS control plane is provided by a third party (not a vBRAS forwarding-plane device vendor). The vBRAS control plane can be connected to the message parsing plug-in microservices provided by other vendors through the RESTFUL interface. To be connected to the vBRAS control plane, a vBRAS forwarding-plane device provided by a vendor not only needs to follow the communication protocol between the vBRAS control plane and the vBRAS forwarding plane, but also needs to provide a message parsing plug-in connected to the vBRAS control plane. The provided message parsing plug-in can parse the vendor-defined private-format data sent by the RADIUS server to the vBRAS control plane. In the initial deployment, the functions of the vBRAS forwarding planes provided by the same vendor are the same, so the functions of the corresponding message parsing plug-ins are also the same. Therefore, multiple vBRAS forwarding planes provided by the same vendor can share the same message parsing plug-in, that is, each vendor needs to deploy only one message parsing plug-in connected to the vBRAS control plane. In this case, the vBRAS control plane uses a vendor-ID as the identification information for identifying the corresponding forwarding-plane device and the corresponding message parsing plug-in. Later, in the existing deployment environment, a vBRAS forwarding-plane device is expanded and upgraded. The original message parsing plug-in cannot satisfy the private-format data parsing required by the new device. A new message parsing plug-in is required so as to be connected to the vBRAS control plane. The vBRAS control plane uses a vendor-ID and the identification information of the corresponding vBRAS forwarding-plane device as the identification information for identifying the new forwarding-plane device and the new message parsing plug-in. The expansion and upgrade of the new vBRAS forwarding-plane device do not affect the normal operation of the original device.

The vBRAS control plane can not only use a vendor-ID as the identification information of the corresponding target device and the corresponding parsing plug-in, but can also use a vendor-ID and the identification information of the corresponding vBRAS forwarding-plane device as the identification information of the corresponding target device and the corresponding message parsing plug-in. The workflow between the vBRAS control plane, the RADIUS server, the vBRAS forwarding planes and the parsing plug-ins is shown in FIG. 9.

In step 9010, the vBRAS control-plane device is deployed. A new virtual machine or container is created on the cloud platform of the data center, and the vBRAS control-plane device provided by a third party (not a vBRAS forwarding-plane device vendor) is started in the virtual machine or container.

In step 9020, vendor-A parsing plug-in 1 is deployed. A new virtual machine or container is created on the cloud platform of the data center, and vendor-A parsing plug-in 1 is started in the virtual machine or container.

In step 9030, the vendor-B parsing plug-in is deployed. A new virtual machine or container is created on the cloud platform of the data center, and the vendor-B parsing plug-in is started in the virtual machine or container.

In step 9040, the connection between the vBRAS control-plane device and the RADIUS server is configured. This step includes configuring the IP address and the RADIUS protocol port number of the RADIUS server.

In step 9050, vBRAS forwarding plane 1 (vendor A) and vBRAS forwarding plane (vendor B) are configured to be connected to the vBRAS control-plane device. This step includes establishing a VXLAN tunnel from a vBRAS forwarding plane to the vBRAS control plane and establishing CUSP connection from a vBRAS forwarding plane to the vBRAS control plane.

In step 9060, vendor-A parsing plug-in 1 is configured to register with the vBRAS control plane. Through the URI, vendor-A parsing plug-in 1 provides its own information to the vBRAS control plane, including the communication address and the vendor-ID. For this step, reference may be made to the arrow line marked with the character 1*d* in FIG. 9.

In step 9070, the vendor-B parsing plug-in is configured to register with the vBRAS control plane. Through the URI, the vendor-B parsing plug-in provides its own information to the vBRAS control plane, including the communication address and the vendor-ID. For this step, reference may be made to the arrow line marked with the character 1*c* in FIG. 9.

In step 9080, through the CUSP, vBRAS forwarding plane 1 (vendor A) and vBRAS forwarding plane (vendor B) actively report their respective identification information, that is, their respective vendor-IDs, to the vBRAS control-plane device. For this step, reference may be made to arrow lines marked with characters 1*a* and 1*b* in FIG. 9.

In step 9090, vendor-A parsing plug-in 2 is expanded, upgraded and deployed. A new virtual machine or container is created on the cloud platform of the data center, and vendor-A parsing plug-in 2 is started in the virtual machine or container.

In step 9100, vBRAS forwarding plane 2 (vendor A) is configured to be connected to the vBRAS control-plane device. This step includes establishing a VXLAN tunnel from the vBRAS forwarding plane to the vBRAS control plane and establishing CUSP connection from the vBRAS forwarding plane to the vBRAS control plane.

In step 9110, vendor-A parsing plug-in 2 is configured to register with the vBRAS control plane. Through the URI, vendor-A parsing plug-in 2 provides its own information to the vBRAS control plane, including the communication address, the vendor-ID, and the identification information of the corresponding vBRAS forwarding-plane device. For this step, reference may be made to the arrow line marked with the character 1*f* in FIG. 9.

In step 9120, through the CUSP, vBRAS forwarding plane 2 (vendor A) actively reports its own identification information, that is, the device identifier and the vendor-ID, to the vBRAS control-plane device. For this step, reference may be made to the arrow line marked with the character 1*e* in FIG. 9.

In step 9130, a broadband user starts to go online; vBRAS forwarding plane 2 (vendor A) receives a PPPoE access request message sent by the broadband user and sends the received original PPPoE access request message and the corresponding receiving interface information (for example, interface Fei-2/1/0/2) to the vBRAS control plane through the VXLAN tunnel. For this step, reference may be made to the arrow line marked with the number 2 in FIG. 9.

In step 9140, after receiving the PPPoE access request message, the vBRAS control-plane device performs processing of and response to the PPPoE access request message according to the PPPoE protocol. Through PPPoE access protocol message interaction, the vBRAS control-plane device obtains the user name information of the broadband user. The vBRAS control-plane device writes the user name information into the Access-Request authentication message defined by the RADIUS protocol and sends an Access-Request authentication request to the RADIUS server. For this step, reference may be made to the arrow line marked with the number 3 in FIG. 9.

In step 9150, after receiving the Access-Request authentication request, the RADIUS server performs authentication according to the user name information carried in the authentication request; if the authentication succeeds, the RADIUS server sends an Access-Accept authentication response to the vBRAS control-plane device. For this step, reference may be made to the arrow line marked with the number 4 in FIG. 9.

In step 9160, after receiving the Access-Accept authentication response message, the vBRAS control-plane device finds the access information of corresponding broadband user according to the value of the Identifier field in the message, including broadband access interface information, for example, interface Fei-2/1/0/2. Through the broadband access interface information, the vBRAS control-plane device obtains the corresponding vBRAS forwarding-plane device and the identifier, that is, the vendor-ID and device identification information, reported by the vBRAS forwarding-plane device. The vBRAS control-plane device parses the attribute information carried in the Access-Accept authentication response message. If the Access-Accept authentication response message carries the vendor-specific attribute defined by the RADIUS protocol, the vBRAS control-plane device searches for a matching message parsing plug-in based on the corresponding vBRAS forwarding-plane identification information, that is, the vendor-ID and device identification information. If the corresponding message parsing plug-in is found, the vBRAS control-plane device sends all vendor-specific attributes in the Access-Accept authentication response message to the corresponding message parsing plug-in through the RESTFUL interface according to the communication address registered by the message parsing plug-in so that the corresponding message parsing plug-in can process the attributes. For this step, reference may be made to the arrow line marked with the number 5 in FIG. 9.

In step 9170, vendor-A parsing plug-in 2 receives vendor-specific attributes from the vBRAS control-plane device through the RESTFUL interface and determines whether the values of the vendor-IDs in the vendor-specific attributes are consistent with the vendor-ID of the vendor-A parsing plug-in; if the values of the vendor-IDs are inconsistent, parsing is forgone; if the values of the vendor-IDs are consistent, the vendor-ID of vendor-specific A is 4097 as defined by vendor A. When the vendor-A parsing plug-in receives 3 vendor-specific attributes sent by the vBRAS control-plane device and the values of the vendor-IDs carried by the 3 vendor-specific attributes are 4096, 4097 and 4098 respectively, vendor-A parsing plug-in 2 parses only the vendor-specific attribute with a vendor-ID value of 4097. According to the private data format defined by vendor A, the vendor-A parsing plug-in 2 parses out all the sub-attributes contained in the vendor-specific attribute with a vendor-ID value of 4097. After completing the parsing of all the vendor-specific attributes and the sub-attributes contained therein, vendor-A parsing plug-in 2 sends the sub-attributes required by the vBRAS control plane to the vBRAS control-plane device by responding to a post request. For this step, reference may be made to the arrow line marked with the number 6 in FIG. 9.

In step 9180, the vBRAS control-plane device receives, from the RESTFUL interface, the parsing result of the vendor-specific attribute sent by vendor-A parsing plug-in 2. Through the parsing result returned by the parsing plug-in and the parsing of other attributes carried in the Access-Accept authentication response message, the vBRAS control-plane device obtains the broadband user authorization information.

In step 9190, after converting the authorization information that needs to be sent to a vBRAS forwarding plane into attributes defined by the communication protocol between the vBRAS control plane and the forwarding plane, the vBRAS control-plane device sends the broadband user authorization information to the corresponding vBRAS forwarding plane through the CUSP connection between the vBRAS control plane and the vBRAS forwarding plane (vBRAS forwarding plane 2 (vendor A)) and in the TLV manner. In the TLV manner, each attribute value in the authorization information is transmitted according to the attribute type, attribute length and attribute value. For this step, reference may be made to the arrow line marked with the number 7 in FIG. 9.

In step 9200, according to the definition of the communication protocol between the vBRAS control plane and a forwarding plane, the vBRAS forwarding-plane device receives the broadband user authorization information and writes the authorization information into the user forwarding table. The vBRAS forwarding-plane device subsequently processes and forwards, according to the user forwarding table, a message used by the broadband user to access a website.

Embodiment Six

Based on the message processing method provided in the preceding embodiments of the present application, embodiment six of the present application provides a message processing apparatus applicable to a vBRAS control-plane device.

Figure 10:
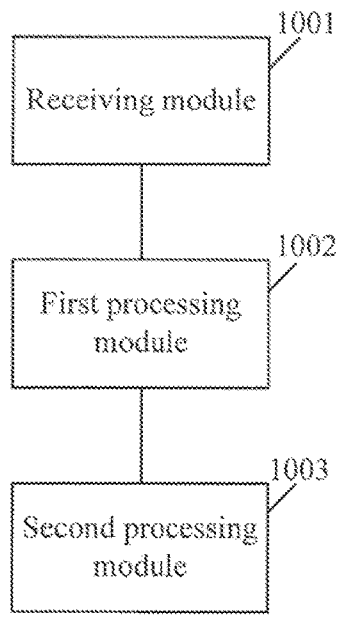
FIG. 10 is a schematic diagram illustrating the structure of a message processing apparatus according to embodiments of the present application.

FIG. 10 is a schematic diagram illustrating the structure of a message processing apparatus according to embodiments of the present application. As shown in FIG. 10, the apparatus includes a receiving module 1001, a first processing module 1002 and a second processing module 1003.

The receiving module 1001 is configured to receive a first message containing at least one type of private-format data.

The first processing module 1002 is configured to determine identification information of a target device according to the first message and select a message parsing plug-in that matches the determined identification information of the target device; and send the first message to the selected message parsing plug-in and receive parsed data from the selected message parsing plug-in, where the parsed data is data obtained after the selected message parsing plug-in parses the at least one type of private-format data.

The second processing module 1003 is configured to determine, according to the parsed data, the manner in which the target device processes a second message used for accessing a website.

In an implementation, the first processing module 1002 is further configured to receive identification information reported by a plurality of target devices and identification information reported by a plurality of message parsing plug-ins; to establish a correspondence between the identification information of the target devices and the identification information of the message parsing plug-ins according to the identification information reported by the target devices and the identification information reported by the message parsing plug-ins; and to select, according to the correspondence, the message parsing plug-in that matches the determined identification information of the target device.

In an implementation, identification information reported by each target device includes the ID of a vendor to which the target device belongs, or identification information reported by each target device includes the ID of a vendor to which the target device belongs and the ID of the target device.

In an implementation, identification information reported by each message parsing plug-in includes the ID of a vendor to which the message parsing plug-in belongs, or identification information reported by each message parsing plug-in includes the ID of a vendor to which the message parsing plug-in belongs and the ID of a respective target device corresponding to the message parsing plug-in.

In an implementation, the determined identification information of the target device includes category identification information and unique identification information. The category identification information is configured to identify the category of the target device. The unique identification information is used for uniquely identifying the target device.

In an implementation, the category identification information includes the ID of the vendor to which the target device belongs, and the unique identification information includes the ID of the target device.

In an implementation, the first processing module 1002 is configured to, when finding, according to the correspondence, a message parsing plug-in that matches both the category identification information and the unique identification information of the determined target device, select the found message parsing plug-in; and, when finding, according to the correspondence, no message parsing plug-in that matches both the category identification information and the unique identification information of the determined target device and when finding, according to the correspondence, a message parsing plug-in that matches the category identification information of the determined target device, select the found message parsing plug-in.

In an implementation, the first processing module 1002 is further configured to, after establishing the correspondence between the identification information of the target devices and the identification information of the message parsing plug-ins, when receiving identification information reported by a newly deployed target device and identification information reported by a newly deployed message parsing plug-in, update the correspondence according to the identification information reported by the newly deployed target device and the identification information reported by the newly deployed message parsing plug-in.

In an implementation, the first processing module 1002 is configured to, when the first message is an authentication response message for a broadband access authentication request, determine the identification information of the target device according to the value of the identifier field in the first message.

In an implementation, the first processing module 1002 is configured to find access information of corresponding broadband user according to the value of the identifier field; and determine the identification information of the target device according to the broadband user access information.

In an implementation, when the at least one type of private-format data includes private-format data of a plurality of vendors, the parsed data is data obtained by parsing after the selected message parsing plug-in filters the private-format data of the plurality of vendors according to identification information of the vendor to which the selected message parsing plug-in belongs.

In an implementation, the second processing module 1003 is configured to, when the first message is an authentication response message for a broadband access authentication request, obtain broadband user authorization information according to the parsed data; and send the broadband user authorization information to the target device to enable the target device to determine, according to the broadband user authorization information, the manner in which the target device processes the second message.

In practical application, the receiving module 1001, the first processing module 1002 and the second processing module 1003 may all be implemented by a central processing unit (CPU), a microprocessor unit (MPU), a digital signal processor (DSP) or a field-programmable gate array (FPGA).

Additionally, in this embodiment, various function modules may be integrated into one processing unit, each unit may be physically present separately, or two or more units may be integrated into one unit. The integrated unit may be implemented by hardware or a software function module.

The integrated unit may be stored in a computer-readable storage medium if implemented in the form of a software function module but not sold or used as an independent product. The solution of this embodiment may substantially be embodied in the form of a software product. The computer software product is stored in a storage medium and includes several instructions for enabling a computer device (which may be a personal computer, a server or a network device) or a processor to execute all or part of the steps of the method described in this embodiment. The preceding storage medium may be a universal serial bus (USB) flash disk, a mobile hard disk, a read-only memory (ROM), a random-access memory (RAM), a magnetic disk, an optical disk or another medium that can store program codes.

The computer program instructions corresponding to the message processing method of this embodiment may be stored in a storage medium such as an optical disk, a hard disk or a USB flash disk. When the computer program instructions stored in the storage medium and corresponding to the message processing method are read or executed by an electronic device, the message processing method of any one of the preceding embodiments is performed.

Figure 11:
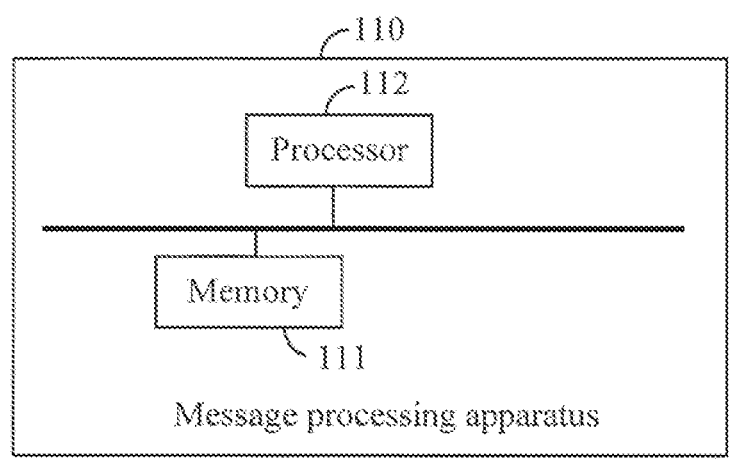
FIG. 11 is a schematic diagram illustrating the hardware structure of a message processing apparatus according to embodiments of the present application.

Based on the same technical concepts as the preceding embodiments, FIG. 11 shows another message processing apparatus 110 provided in embodiments of the present application. The apparatus may include a memory 111 and a processor 112.

The memory 111 is configured to store a computer program and data.

The processor 112 is configured to execute the computer program stored in the memory to perform the message processing method of any one of the preceding embodiments.

In practical application, the memory 111 may be a volatile memory such as a RAM, may be a non-volatile memory such as a ROM, a flash memory, a hard disk drive (HDD) or a solid-state drive (SSD), or may be a combination thereof, and the memory 111 provides instructions and data for the processor.

The processor 112 may be at least one of an ASIC, a DSP, a DSPD, a PLD, an FPGA, a CPU, a controller, a microcontroller or a microprocessor. For a different device, the electronic component configured to implement the functions of the processor may be another electronic component and is not limited in embodiments of the present application.

In an implementation, the message parsing plug-in is deployed independently of a forwarding-plane device or deployed at the forwarding-plane device.

In an implementation, the target device is the forwarding-plane device.

Embodiment Seven

Embodiment seven of the present application provides a control-plane device. The device includes any message processing apparatus of embodiment six of the present application.

Embodiments of the present application may be provided as methods, systems or computer program products. Therefore, the present application may take the form of a hardware embodiment, a software embodiment, or an embodiment combining software and hardware. The present application may take the form of a computer program product implemented on one or more computer-usable storage media (including, but not limited to, a disk memory and an optical memory) that include computer-usable program codes.

The present disclosure is described with reference to flowcharts and/or block diagrams of methods, apparatus (systems) and computer program products according to embodiments of the present disclosure. It is to be understood that each flow and/or block in the flowcharts and/or block diagrams and a combination of flows and/or blocks in the flowcharts and/or block diagrams may be implemented using computer program instructions. These computer program instructions may be provided to a processor of a general-purpose computer, special-purpose computer, embedded processor or another programmable data processing device to produce a machine so as to enable the instructions executed by the processor of the computer or another programmable data processing device to generate an apparatus for implementing the functions specified in one or more flows in the flowcharts and/or one or more blocks in the block diagrams.

These computer program instructions may also be stored in a computer-readable memory that can direct a computer or another programmable data processing device to operate in a particular manner, so that the instructions stored in the computer-readable memory produce an article of manufacture including an instruction apparatus. The instruction apparatus implements the functions specified in one or more flows in the flowcharts and/or one or more blocks in the block diagrams.

These computer program instructions may also be loaded onto a computer or another programmable data processing device so that a series of operating steps are performed on a computer or another programmable device, and thereby the instructions executed on the computer or another programmable device provide steps for implementing the functions specified in one or more flows in the flowcharts and/or one or more blocks in the block diagrams.

The preceding are merely embodiments of the present application and are not intended to limit the scope of the present application.

What is claimed is:

1. A message processing method, comprising:
receiving a first message containing at least one type of private-format data sent by an authentication and authorization server, wherein the first message is an authentication response message for a broadband access authentication request;
determining identification information of a target device according to the first message and selecting a message parsing plug-in that matches the determined identification information of the target device; and sending the first message to the selected message parsing plug-in and receiving parsed data from the selected message parsing plug-in, wherein the parsed data is data obtained after the selected message parsing plug-in parses the at least one type of private-format data in the first message, and the target device is a forwarding-plane device; and
determining, according to the parsed data, a manner in which the target device processes a second message used for accessing a website.

2. The method of claim 1, further comprising:
receiving identification information reported by a plurality of target devices and identification information reported by a plurality of message parsing plug-ins; and
establishing a correspondence between the identification information of the plurality of target devices and the identification information of the plurality of message parsing plug-ins according to the identification information reported by the plurality of target devices and the identification information reported by the plurality of message parsing plug-ins;
selecting the message parsing plug-in that matches the determined identification information of the target device comprising:
selecting, according to the correspondence, the message parsing plug-in that matches the determined identification information of the target device.

3. The method of claim 2, wherein identification information reported by each of the plurality of target devices comprises an identifier (ID) of a respective vendor to which the each of the plurality of target devices belongs, or identification information reported by each of the plurality of target devices comprises an ID of a respective vendor to which the each of the plurality of target devices belongs and an ID of the each of the plurality of target devices.

4. The method of claim 2, wherein identification information reported by each of the plurality of message parsing plug-ins comprises an ID of a respective vendor to which the each of the plurality of message parsing plug-ins belongs, or identification information reported by each of the plurality of message parsing plug-ins comprises an ID of a respective vendor to which the each of the plurality of message parsing plug-ins belongs and an ID of a respective target device corresponding to the each of the plurality of message parsing plug-ins.

5. The method of claim 2, wherein the determined identification information of the target device comprises category identification information and unique identification information, the category identification information is used for identifying a category of the target device, and the unique identification information is used for uniquely identifying the target device.

6. The method of claim 5, wherein the category identification information comprises an ID of a vendor to which the target device belongs, and the unique identification information comprises an ID of the target device.

7. The method of claim 6, wherein selecting, according to the correspondence, the message parsing plug-in that matches the determined identification information of the target device comprises:
in response to finding, according to the correspondence, a message parsing plug-in that matches both the category identification information and the unique identification information of the target device, selecting the found message parsing plug-in; and
in response to, according to the correspondence, finding no message parsing plug-in that matches both the category identification information and the unique identification information of the target device and finding a message parsing plug-in that matches the category identification information of the target device, selecting the found message parsing plug-in.

8. The method of claim 5, wherein selecting, according to the correspondence, the message parsing plug-in that matches the determined identification information of the target device comprises:
in response to finding, according to the correspondence, a message parsing plug-in that matches both the category identification information and the unique identification information of the target device, selecting the found message parsing plug-in; and
in response to, according to the correspondence, finding no message parsing plug-in that matches both the category identification information and the unique identification information of the target device and finding a message parsing plug-in that matches the category identification information of the target device, selecting the found message parsing plug-in.

9. The method of claim 2, after establishing the correspondence between the identification information of the plurality of target devices and the identification information of the plurality of message parsing plug-ins, further comprising:
in response to receiving identification information reported by a newly deployed target device and identification information reported by a newly deployed message parsing plug-in, updating the correspondence according to the identification information reported by the newly deployed target device and the identification information reported by the newly deployed message parsing plug-in.

10. The method of claim 1, wherein determining the identification information of the target device according to the first message comprises:
determining the identification information of the target device according to a value of an identifier field in the first message.

11. The method of claim 10, wherein determining the identification information of the target device according to the value of the identifier field in the first message comprises:
finding access information of corresponding broadband user according to the value of the identifier field in the first message; and
determining the identification information of the target device according to the broadband user access information.

12. The method of claim 1, wherein the at least one type of private-format data comprises private-format data of a plurality of vendors, and the parsed data is data obtained by parsing after the selected message parsing plug-in filters the private-format data of the plurality of vendors according to identification information of a vendor to which the selected message parsing plug-in belongs.

13. The method of claim 1, wherein determining, according to the parsed data, the manner in which the target device processes the second message used for accessing the website comprises:
obtaining broadband user authorization information according to the parsed data; and
sending the broadband user authorization information to the target device to enable the target device to determine, according to the broadband user authorization information, the manner in which the target device processes the second message used for accessing the website.

14. A message processing apparatus, comprising a processor and a memory configured to store a computer program running on the processor, wherein the processor is configured to perform, when executing the computer program, the following steps:
receiving a first message containing at least one type of private-format data sent by an authentication and authorization server, wherein the first message is an authentication response message for a broadband access authentication request;
determining identification information of a target device according to the first message and selecting a message parsing plug-in that matches the determined identification information of the target device; and sending the first message to the selected message parsing plug-in and receiving parsed data from the selected message parsing plug-in, wherein the parsed data is data obtained after the selected message parsing plug-in parses the at least one type of private-format data in the first message, and the target device is a forwarding-plane device; and
determining, according to the parsed data, a manner in which the target device processes a second message used for accessing a website.

15. The apparatus of claim 14, wherein a manner in which the message parsing plug-in is deployed is that: the message parsing plug-in is deployed independently of the forwarding-plane device or deployed at the forwarding-plane device.

16. A control-plane device, comprising the message processing apparatus of claim 14.

17. A non-transitory computer storage medium, storing a computer program, wherein the computer program, when executed by a processor, performs the following steps:
receiving a first message containing at least one type of private-format data sent by an authentication and authorization server, wherein the first message is an authentication response message for a broadband access authentication request;
determining identification information of a target device according to the first message and selecting a message parsing plug-in that matches the determined identification information of the target device; and sending the first message to the selected message parsing plug-in and receiving parsed data from the selected message parsing plug-in, wherein the parsed data is data obtained after the selected message parsing plug-in parses the at least one type of private-format data in the first message, and the target device is a forwarding-plane device; and determining, according to the parsed data, a manner in which the target device processes a second message used for accessing a website.

* * * * *